United States Patent
Manning et al.

[11] Patent Number: 6,002,667
[45] Date of Patent: Dec. 14, 1999

[54] MINIMUM GUARANTEED CELL RATE METHOD AND APPARATUS

[75] Inventors: Thomas A. Manning, Northboro; Stephen A. Caldara, Sudbury; Stephen A. Hauser, Burlington, all of Mass.

[73] Assignees: Fujitsu Network Communications, Inc., Richardson, Tex.; Fujitsu Limited, Kawasaki, Japan

[21] Appl. No.: 08/683,449

[22] Filed: Jul. 18, 1996

Related U.S. Application Data

[60] Provisional application No. 60/001,498, Jul. 19, 1995.

[51] Int. Cl.$^6$ ................................. H04L 12/56
[52] U.S. Cl. .................. 370/232; 370/253; 370/236; 370/412
[58] Field of Search ................... 370/229, 230, 370/231, 235, 236, 252, 253, 395, 397, 412, 428, 232, 468

[56] References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |

(List continued on next page.)

FOREIGN PATENT DOCUMENTS 484943  3/1992  Japan .

OTHER PUBLICATIONS

Head of Line Arbitration in ATM Switches with Input–Output Buffering and Backpressure Control. by Hosein F. Badran and H. T. Mouftah, *Globecom* '91, pp. 0347–0351.

*An Ascom Timeplex White Paper*, Meeting Critical Requirements with Scalable Enterprise Networking Solutions Based on a Unified ATM Foundation, pp. 1–12, Apr. 1994.

Douglas H. Hunt, ATM Traffic Management—Another Perspective, *Business Communications Review*, Jul. 1994.

Richard Bubenik et al., Leaf Initiated Join Extensions, Technical Committee, Signalling Subworking Group, ATM Forum/94–0325R1, Jul. 1, 1994.

(List continued on next page.)

*Primary Examiner*—Chau Nguyen
*Attorney, Agent, or Firm*—Weingarten, Schurgin, Gagnebin & Haynes LLP

[57] ABSTRACT

A method and apparatus for providing a minimum per-connection bandwidth guarantee and the ability to employ shared bandwidth thereabove in an environment having both virtual-connection and link-level flow control. A buffer pool downstream of a transmitter and disposed in a receiver is divided among a first portion dedicated for allocated bandwidth cell traffic and a second portion for dynamic bandwidth cell traffic. Link flow control enables receiver cell buffer sharing while maintaining the per-connection bandwidth guarantee. No cell-loss due to buffer overflows at the receiver is also guaranteed, resulting in high link-utilization in a frame traffic environment, as well as low delay in the absence of cell retransmission. A higher and thus more efficient utilization of receiver cell buffers is achieved.

18 Claims, 23 Drawing Sheets

U.S. PATENT DOCUMENTS

| | | | |
|---|---|---|---|
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,159 | 10/1989 | Hemmady et al. | 370/60 |
| 4,872,160 | 10/1989 | Hemmady et al. | 370/60 |
| 4,878,216 | 10/1989 | Yunoki | 370/60 |
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 385/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 6/1994 | Faulk, Jr. | 370/94 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/60 |
| 5,319,638 | 6/1994 | Lin | 370/60 |
| 5,321,695 | 4/1994 | Proctor et al. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,365,514 | 11/1994 | Hershey | 370/17 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |
| 5,392,280 | 2/1995 | Zheng | 370/60 |
| 5,392,402 | 2/1995 | Robrock, II | 395/200 |
| 5,394,396 | 2/1995 | Yoshimura et al. | 370/60 |
| 5,394,397 | 2/1995 | Yanagi et al. | 370/60.1 |
| 5,398,235 | 3/1995 | Tsuzuki et al. | 370/16 |
| 5,400,337 | 3/1995 | Munter | 370/60.1 |
| 5,402,415 | 3/1995 | Turner | 370/60 |
| 5,412,648 | 5/1995 | Fan | 370/60 |

| Patent No. | Date | Inventor | Class |
|---|---|---|---|
| 5,414,703 | 5/1995 | Sakaue et al. | 370/60 |
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 7/1995 | Derby et al. | 370/54 |
| 5,425,026 | 7/1995 | Mori | 370/60 |
| 5,432,713 | 7/1995 | Takeo et al. | 364/514 |
| 5,432,784 | 7/1995 | Ozveren | 370/79 |
| 5,432,785 | 7/1995 | Ahmed et al. | 370/79 |
| 5,432,908 | 7/1995 | Heddes et al. | 395/250 |
| 5,436,886 | 7/1995 | McGill | 370/16 |
| 5,436,893 | 7/1995 | Barnett | 370/60.1 |
| 5,440,547 | 8/1995 | Easki et al. | 370/60 |
| 5,444,702 | 8/1995 | Burnett et al. | 370/60.1 |
| 5,446,733 | 8/1995 | Tsuruoka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,450,406 | 9/1995 | Esaki et al. | 370/60.1 |
| 5,452,296 | 9/1995 | Shimizu | 370/60.1 |
| 5,455,820 | 10/1995 | Yamada | 370/17 |
| 5,455,825 | 10/1995 | Lauer et al. | 370/60 |
| 5,457,687 | 10/1995 | Newman | 370/85.3 |
| 5,459,743 | 10/1995 | Fukuda et al. | 371/67.1 |
| 5,461,611 | 10/1995 | Drake, Jr. et al. | 370/54 |
| 5,463,620 | 10/1995 | Sriram | 370/60 |
| 5,465,331 | 11/1995 | Yang et al. | 395/200.08 |
| 5,475,679 | 12/1995 | Munter | 370/58.2 |
| 5,479,401 | 12/1995 | Bitz et al. | 370/60.1 |
| 5,479,402 | 12/1995 | Hata et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Kakuma et al. | 370/16 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 370/60.2 |
| 5,504,741 | 4/1996 | Yamanaka et al. | 370/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,517,495 | 5/1996 | Lund et al. | 370/60 |
| 5,519,690 | 5/1996 | Suzuka et al. | 370/17 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/79 |
| 5,530,695 | 6/1996 | Dighe et al. | 370/17 |
| 5,533,009 | 7/1996 | Chen | 370/17 |
| 5,533,020 | 7/1996 | Byrn et al. | 370/60.1 |
| 5,535,196 | 7/1996 | Aihara et al. | 370/60 |
| 5,535,197 | 7/1996 | Cotton | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60.1 |
| 5,550,821 | 8/1996 | Akiyoshi | 370/60.1 |
| 5,550,823 | 8/1996 | Irie et al. | 370/60.1 |
| 5,553,057 | 9/1996 | Nakayama | 370/13 |
| 5,553,068 | 9/1996 | Aso et al. | 370/60 |
| 5,555,243 | 9/1996 | Kakuma et al. | 370/58.2 |
| 5,555,265 | 9/1996 | Kakuma et al. | 370/60 |
| 5,557,607 | 9/1996 | Holden | 370/58.2 |
| 5,568,479 | 10/1996 | Watanabe et al. | 370/60.1 |
| 5,570,361 | 10/1996 | Norizuki et al. | 370/60.1 |
| 5,570,362 | 10/1996 | Nishimura | 370/60.1 |
| 5,572,522 | 11/1996 | Calamvokis et al. | 370/60.1 |
| 5,577,032 | 11/1996 | Sone et al. | 370/58.3 |
| 5,577,035 | 11/1996 | Hayter et al. | 370/60 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |
| 5,633,861 | 5/1997 | Hanson et al. | 370/232 |

OTHER PUBLICATIONS

Douglas H. Hunt et al., Flow Controlled Virtual Connections Proposal for ATM Traffic Management (Revision R2), Traffic Management Subworking Group, $ATM\_Forum/94-0632R2$, Aug. 1994.

Flavio Bonomi et al., The Rate–Based Flow Control Framework for the Available Bit Rate ATM Service, *IEEE Network*, Mar./Apr. 1995, pp. 25–39.

R. Jain, Myths About Congestion Management in High Speed Networks, *Internetworking Research and Experience*, vol. 3, 101–113 (1992).

Douglas H. Hunt et al., Credit–Based FCVC Proposal for ATM Traffic Management (Revision R1), *ATM Forum Technical Committee Traffic Management Subworking Group*, $ATM\_Forum/94-0168R1$, Apr. 28, 1994.

Douglas H. Hunt et al., Action Item Status for Credit–Based FCVC Proposal, ATM Forum Technical Committee Traffic Management Subworking Group, $ATM\_Forum/94-0439$, Apr. 28, 1994.

Timothy P. Donahue et al., Arguments in Favor of Continuing Phase 1 as the Initial ATM Forum P–NNI Routing Protocol Implementation, *ATM Forum Technical Committee, ATM Forum/94–0460*, Apr. 28, 1994.

Richard Bubenik et al., Leaf Initiated Join Extensions, Technical Committee, Signalling Subworking Goup, *ATM Forum/94–0325*, Apr. 28, 1994.

Rob Coltun et al., PRP: A P–NNI Routing Protocol Proposal, ATM Forum Technical Committee, ATM_Forum/94–0492, Apr. 28, 1994.

Richard Bubenik et al., Leaf Initiated Join Extensions, ATM Forum Technical Committee, Signaling Subworking Group, ATM Forum 94–0325, Apr. 28, 1994.

Richard Bubenik et al., Requirements For Phase 2 Signaling Protocol, ATM Forum Technical Committee, Signaling Subworking Group, ATM Forum 94–1078, Jan. 1, 1994.

SITA, ATM RFP: C–Overall Technical Requirements, Sep. 1994.

H.T. Kung and K. Chang, Receiver–Oriented Adaptive Buffer Allocation in Credit–Based Flow Control for ATM Networks, *Proceedings of INFOCOM '95,* Apr. 2–6, 1995, pp. 1–14.

H.T. Kung, et al., Credit–Based Flow Control for ATM Networks: Credit Update Protocol, Adaptive Credit Allocation, and Statistical Multiplexing, *Proceedings of ACM SIGCOMM '94 Symposium on Communications Architectures, Protocols and Applications,* Aug. 31–Sep. 2, 1994, pp. 1–14.

MINIMUM GUARANTEED CELL RATE METHOD AND APPARATUS

RELATED APPLICATION

This application claims benefit of U.S. Provisional Application Ser. No. 60/001,498, filed Jul. 19, 1995.

FIELD OF THE INVENTION

This application relates to communications methods and apparatus in a distributed switching architecture, and in particular to bandwidth management in a distributed switching architecture.

BACKGROUND OF THE INVENTION

A Flow Controlled Virtual Connection (FCVC) protocol for use in a distributed switching architecture is presently known in the art, and is briefly discussed below with reference to FIG. 1. This protocol involves communication of status (buffer allocation and current state) on a per virtual connection, such as a virtual channel connection or virtual path connection, basis between upstream and downstream network elements to provide a "no cell loss" guarantee. A cell is the unit of data to be transmitted. Each cell requires a buffer to store it.

One example of this protocol involves a credit-based flow control system, where a number of connections exist within the same link with the necessary buffers established and flow control monitored on a per-connection basis. Buffer usage over a known time interval, the link round-trip time, is determined in order to calculate the per-connection bandwidth. A trade-off is established between maximum bandwidth and buffer allocation per connection. Such per-connection feedback and subsequent flow control at the transmitter avoids data loss from an inability of the downstream element to store data cells sent from the upstream element. The flow control protocol isolates each connection, ensuring lossless cell transmission for that connection. However, since buffers reserved for a first connection cannot be made available for (that is, shared with) a second connection without risking cell loss in the first connection, the cost of the potentially enormous number of cell buffers required for long-haul, high-bandwidth links, each supporting a large number of connections, quickly becomes of great significance.

Connection-level flow control results in a trade-off between update frequency and the realized bandwidth for the connection. High update frequency has the effect of minimizing situations in which a large number of receiver cell buffers are available, though the transmitter incorrectly believes the buffers to be unavailable. Thus it reduces the number of buffers that must be set aside for a connection. However, a high update frequency to control a traffic flow will require a high utilization of bandwidth (in the reverse direction) to supply the necessary flow control buffer update information where a large number of connections exist in the same link. Realizing that transmission systems are typically symmetrical with traffic flowing in both directions, and flow control buffer update information likewise flowing in both directions, it is readily apparent that a high update frequency is wasteful of the bandwidth of the link. On the other hand, using a lower update frequency to lower the high cost of this bandwidth loss in the link, in turn requires that more buffers be set aside for each connection. This trade-off can thus be restated as being between more efficient receiver cell buffer usage and a higher cell transmission rate. In practice, given a large number of connections in a given link, it turns out that any compromise results in both too high a cost for buffers and too much bandwidth wasted in the link.

Therefore, presently known cell transfer flow control protocols fail to provide for efficient use of a minimized receiver cell buffer pool and a high link data transfer efficiency, while simultaneously maintaining a "no cell loss" guarantee on a per-connection basis when a plurality of connections exist in the same link.

Other protocols that use end-to-end flow control require information regarding newly available bandwidth to travel all the way back to the origin of the connection in order to take advantage of such newly available bandwidth at any one point in a series of network elements. The response delay may result in under-utilization of the link. Prior mechanisms weren't defined for ensuring no cell loss in conjunction with a minimum bandwidth guarantee on a per-connection basis.

SUMMARY OF THE INVENTION

The presently claimed invention provides, in a link-level and virtual-connection flow controlled environment, the ability to guarantee a minimum bandwidth to a connection through a link, the ability to employ shared bandwidth thereabove, and the ability to guarantee no cell-loss due to buffer overflows at the receiver, while providing a high level of link utilization efficiency. The amount of the bandwidth guarantee is individually programmable for each connection. A buffer resource in a receiver, downstream of a transmitter, is logically divided into first buffers dedicated to allocated bandwidth cell traffic and buffers shared among dynamic bandwidth cell traffic. The invention utilizes elements in both the transmitter and the receiver, at both the connection level and link level, necessary for enabling the provision of buffer state flow control at the link level, otherwise known as link flow control, in addition to flow control on a per-connection basis. Link flow control enables receiver cell buffer sharing while maintaining a per-connection bandwidth guarantee. A higher and thus more efficient utilization of receiver cell buffers is achieved. No cell-loss due-to buffer overflows at the receiver is guaranteed, leading to high link utilization in a frame traffic environment, as well as low delay in the absence of cell retransmission.

In such a system, link flow control may have a high update frequency, whereas connection flow control information may have a low update frequency. The end result is a low effective update frequency since link level flow control exists only once per link basis whereas the link typically has many connections within it, each needing their own flow control. This minimizes the wasting of link bandwidth to transmit flow control update information. However, since the whole link now has a flow control mechanism ensuring lossless transmission for it and thus for all of the connections within it, buffers may be allocated from a pool of buffers and thus connections may share in access to available buffers. Sharing buffers means that fewer buffers are needed since the projected buffers required for a link in the defined known time interval may be shown to be less than the projected buffers that would be required if independently calculated and summed for all of the connections within the link for the same time interval. Furthermore, the high update frequency that may be used on the link level flow control without undue wasting of link bandwidth, allows further minimization of the buffers that must be assigned to a link. Minimizing the number of cell buffers at the receiver significantly decreases net receiver cost.

The link can be defined either as a physical link or as a logical grouping comprised of logical connections.

The resultant system adds more capability than is defined in the presently known art. It eliminates the excessive wasting of link bandwidth that results from reliance on a per-connection flow control mechanism alone, while taking advantage of both a high update frequency at the link level and buffer sharing to minimize the buffer requirements of the receiver. Yet this flow control mechanism still ensures the same lossless transmission of cells as would the prior art.

As an additional advantage of this invention, a judicious use of the counters associated with the link level and connection level flow control mechanisms, allows easy incorporation of a dynamic buffer allocation mechanism to control the number of buffers allocated to each connection, further reducing the buffer requirements.

Additional counters associated with the link level and connection level flow control mechanisms at the transmitter therefore provide the ability to guarantee a minimum, allocated bandwidth to a connection through a link, the ability to transmit dynamically distributed bandwidth in conjunction therewith, and the ability to guarantee no cell-loss, while providing a high level of link utilization efficiency. Any given connection can be flow controlled below the guaranteed minimum, but only by the receiver as a result of congestion downstream on the same connection; congestion on other connections does not result in bandwidth reduction below the allocated rate.

The presently disclosed mechanism may further be combined with a mechanism for prioritized access to a shared buffer resource.

BRIEF DESCRIPTION OF THE DRAWINGS

The above and further advantages may be more fully understood by referring to the following description and accompanying drawings of which.

DETAILED DESCRIPTION

Figure 1:
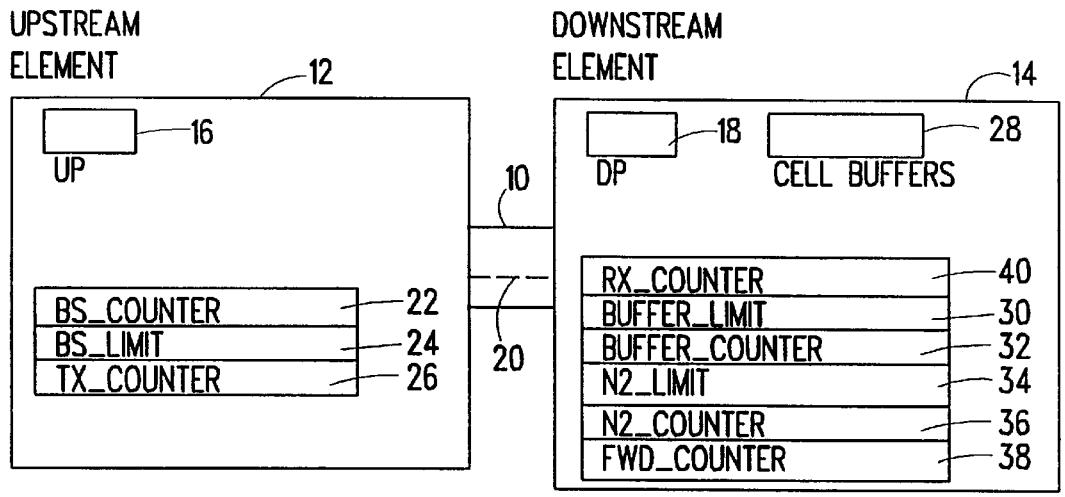
FIG. 1 is a block diagram of a connection-level flow control apparatus as known in the prior art.

In FIG. 1, the resources required for connection-level flow control are presented. As previously stated, the illustrated configuration of FIG. 1 is presently known in the art. However, a brief discussion of a connection-level flow control arrangement will facilitate an explanation of the presently disclosed link-level flow control method and apparatus.

One link 10 is shown providing an interface between an upstream transmitter element 12, also known as an UP subsystem, and a downstream receiver element 14, also known as a DP subsystem. Each element 12, 14 can act as a switch between other network elements. For instance, the upstream element 12 in FIG. 1 can receive data from a PC (not shown) This data is communicated through the link 10 to the downstream element 14, which in turn can forward the data to a device such as a printer (not shown). Alternatively, the illustrated network elements 12, 14 can themselves be network end-nodes.

The essential function of the presently described arrangement is the transfer of data cells from the upstream element 12 via a connection 20 in the link 10 to the downstream element 14, where the data cells are temporarily held in cell buffers 28. Cell format is known, and is further described in "Quantum Flow Control", Version 1.5.1, dated Jun. 27, 1995 and subsequently published in a later version by the Flow Control Consortium. In FIG. 1, the block labelled Cell Buffers 28 represents a set of cell buffers dedicated to the respective connection 20. Data cells are released from the buffers 28, either through forwarding to another link beyond the downstream element 14, or through cell utilization within the downstream element 14. The latter event can include the construction of data frames from the individual data cells if the downstream element 14 is an end-node such as a work station.

Each of the upstream and downstream elements 12, 14 are controlled by respective processors, labelled UP (Upstream Processor) 16 and DP (Downstream Processor) 18. Associated with each of the processors 16, 18 are sets of buffer counters for implementing the connection-level flow control. These buffer counters are each implemented as an increasing counter/limit register set to facilitate resource usage changes. The counters of FIG. 1, described in further detail below, are implemented in a first embodiment in UP internal RAM. The counter names discussed and illustrated for the prior art utilize some of the same counter names as used with respect to the presently disclosed flow control method and apparatus. This is merely to indicate the presence of a similar function or element in the prior art with respect to counters, registers, or like elements now disclosed.

Within the link 10, which in a first embodiment is a copper conductor, multiple virtual connections 20 are provided. In an alternative embodiment, the link 10 is a logical grouping of plural virtual connections 20. The number of connections 20 implemented within the link 10 depends upon the needs of the respective network elements 12, 14, as well as the required bandwidth per connection. In FIG. 1, only one connection 20 and associated counters are illustrated for simplicity.

First, with respect to the upstream element 12 of FIG. 1, two buffer state controls are provided, BS_Counter 22 and BS_Limit 24. In a first embodiment, each are implemented as fourteen bit counters/registers, allowing a connection to have 16,383 buffers. This number would support, for example, 139 Mbps, 10,000 kilometer round-trip service. The buffer state counters 22, 24 are employed only if the connection 20 in question is flow-control enabled. That is, a bit in a respective connection descriptor, or queue descriptor, of the UP 16 is set indicating the connection 20 is flow-control enabled.

BS_Counter 22 is incremented by the UP 16 each time a data cell is transferred out of the upstream element 12 and through the associated connection 20. Periodically, as described below, this counter 22 is adjusted during an update event based upon information received from the downstream element 14. BS_Counter 22 thus presents an indication of the number of data cells either currently being transmitted in the connection 20 between the upstream and downstream elements 12, 14, or yet unreleased from buffers 28 in the downstream element 14.

BS_Limit 24 is set at connection configuration time to reflect the number of buffers 28 available within the receiver 14 for this connection 20. For instance, if BS_Counter 22 for this connection 20 indicates that twenty data cells have been transmitted and BS_Limit 24 indicates that this connection 20 is limited to twenty receiver buffers 28, the UP 16 will inhibit further transmission from the upstream element 12 until an indication is received from the downstream element 14 that further buffer space 28 is available for that connection 20.

Tx_Counter 26 is used to count the total number of data cells transmitted by the UP 16 through this connection 20. In the first embodiment, this is a twenty-eight bit counter which rolls over at 0xFFFFFFFF. As described later, Tx_Counter 26 is used during a check event to account for errored cells for this connection 20.

In the downstream element 14, the DP 18 also manages a set of counters for each connection 20. Buffer_Limit 30 performs a policing function in the downstream element 14 to protect against misbehaving transmitters. Specifically, the buffer_limit register 30 indicates the maximum number of cell buffers 28 in the receiver 14 which this connection 20 can use. In most cases, BS_Limit 24 is equal to Buffer_Limit 30. At some point, though, it may be necessary to adjust the maximum number of cell buffers 28 for this connection 20 up or down. This function is coordinated by network management software. To avoid the "dropping" of data cells in transmission, an increase in buffers per connection is reflected first in Buffer_Limit 30 prior to BS_Limit 24. Conversely, a reduction in the number of receiver buffers per connection is reflected first in BS_Limit 24 and thereafter in Buffer_Limit 30.

Buffer_Counter 32 provides an indication of the number of buffers 28 in the downstream element 14 which are currently being used for the storage of data cells. As described subsequently, this value is used in providing the upstream element 12 with a more accurate picture of buffer availability in the downstream element 14. Both the Buffer_Limit 30 and Buffer_Counter 32 are fourteen bits wide in the first embodiment.

N2_Limit 34 determines the frequency of connection flow-rate communication to the upstream transmitter 12. A cell containing such flow-rate information is sent upstream every time the receiver element 14 forwards a number of cells equal to N2_Limit 34 out of the receiver element 14. This updating activity is further described subsequently. In the first embodiment, N2_Limit 34 is six bits wide.

The DP 18 uses N2_Counter 36 to keep track of the number of cells which have been forwarded out of the receiver element 14 since the last time the N2_Limit 34 was reached. In the first embodiment, N2_Counter 36 is six bits wide.

In a first embodiment, the DP 18 maintains Fwd_Counter 38 to maintain a running count of the total number of cells forwarded through the receiver element 14. This includes buffers released when data cells are utilized for data frame construction in an end-node. When the maximum count for this counter 38 is reached, the counter rolls over to zero and continues. The total number of cells received by the receiver element 14 can be derived by adding Buffer_Counter 32 to Fwd_Counter 38. The latter is employed in correcting the transmitter element 12 for errored cells during the check event, as described below. Fwd_Counter 38 is twenty-eight bits wide in the first embodiment.

In a second embodiment, the DP 18 maintains Rx_Counter 40, a counter which is incremented each time the downstream element 14 receives a data cell through the respective connection 20. The value of this counter 40 is then usable directly in response to check cells and in the generation of an update cell, both of which will be described further below. Similar to the Fwd_Counter 38, Rx_Counter 40 is twenty-eight bits wide in this second embodiment.

There are two events in addition to a steady state condition in the connection-level flow controlled protocol: update; and check. In steady state, data cells are transmitted from the transmitter element 12 to the receiver element 14. In update, buffer occupancy information is returned upstream by the receiver element 14 to correct counter values in the transmitter element 12. Check mode is used to check for cells lost or injected due to transmission errors between the upstream transmitter and downstream receiver elements 12, 14.

In the accompanying figures, connection level counters are augmented with "[i]" to indicate association with one connection [i] of plural possible connections.

Figure 3A:
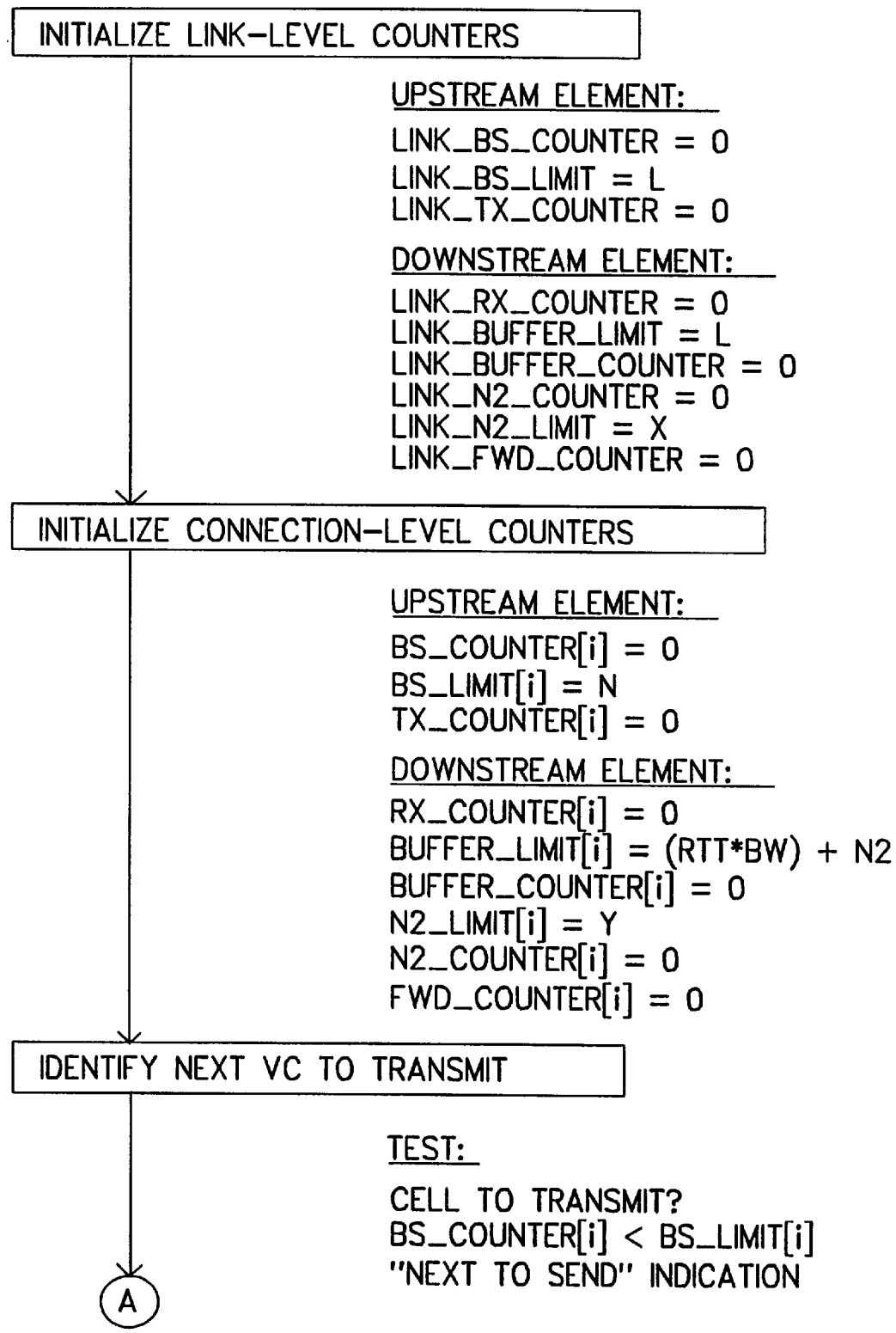
FIGS. 3A and 3B are flow diagram representations of counter initialization and preparation for cell transmission within a flow control method according to the present invention.

Prior to any activity, counters in the upstream and downstream elements 12, 14 are initialized, as illustrated in FIG. 3A. Initialization includes zeroing counters, and providing initial values to limit registers such as Link_BS_Limit and Link_Buffer_Limit. In FIG. 3A, Buffer_Limit[i] is shown being initialized to (RTT*BW)+N2, which represents the round-trip time times the virtual connection bandwidth, plus accommodation for delays in processing the update cell. As for Link_N2_Limit, "X" represents the buffer state update frequency for the link, and for N2_Limit[i], "Y" represents the buffer state update frequency for each connection.

Figure 3B:
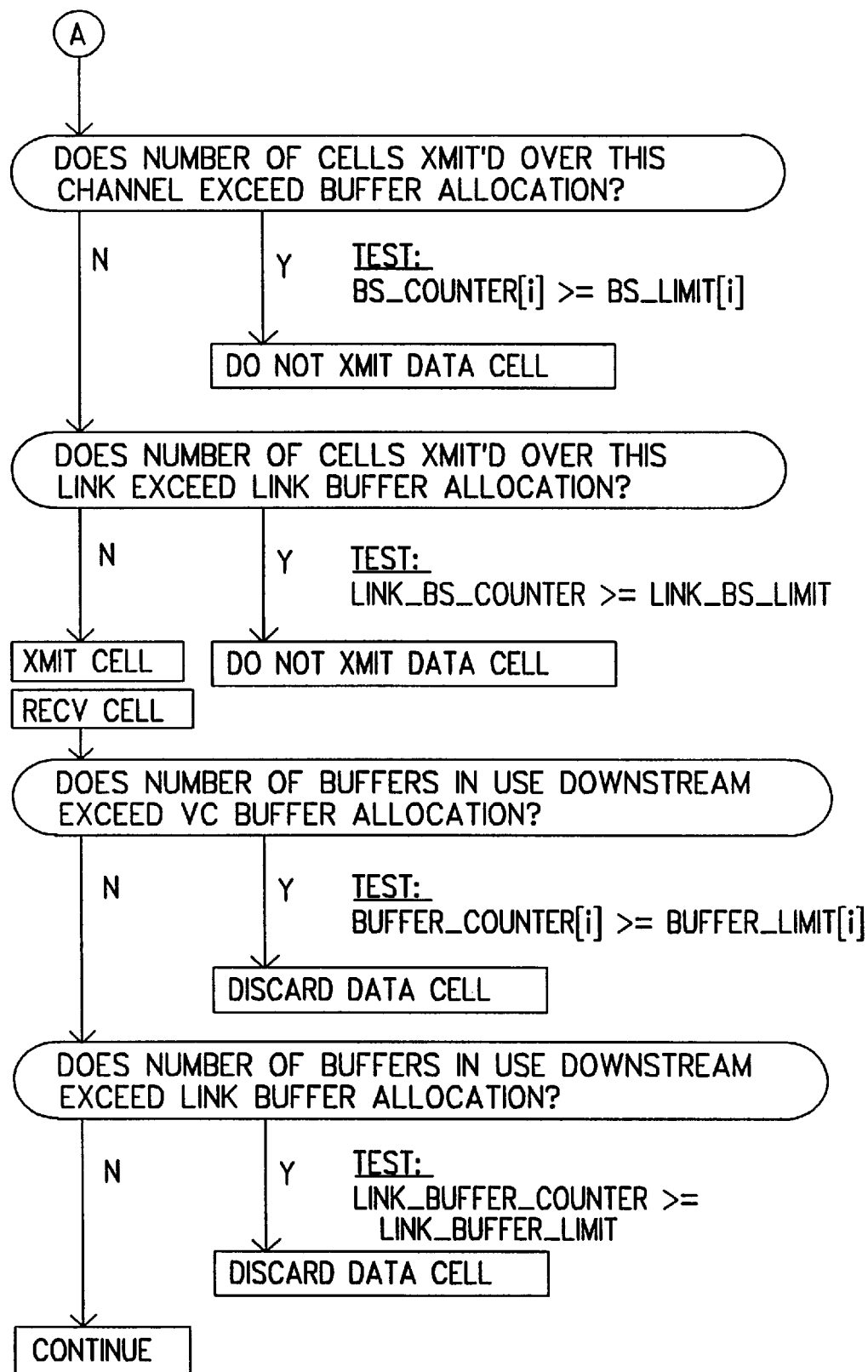

In steady state operation, the UP 16 of the transmitter element 12 determines which virtual connection 20 (VC) has a non-zero cell count (i.e. has a cell ready to transmit), a BS_Counter value less than the BS_Limit, and an indication that the VC is next to send (also in FIGS. 3A and 3B).

Figure 4:
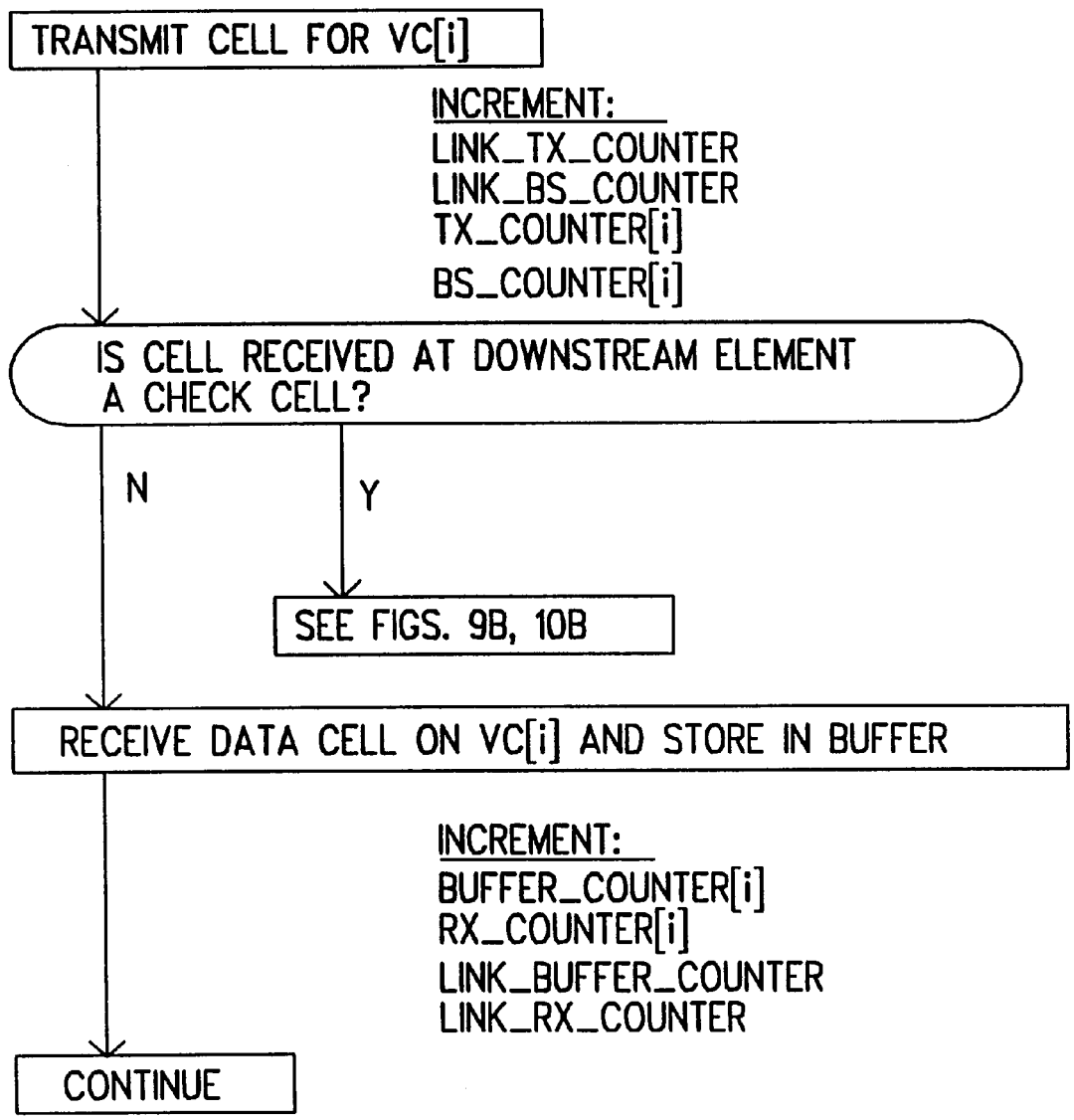
FIG. 4 is a flow diagram representation of cell transmission within the flow control method according to the present invention.

The UP 16 increments BS_Counter 22 and Tx_Counter 26 whenever the UP 16 transmits a data cell over the respective connection 20, assuming flow control is enabled (FIG. 4). Upon receipt of the data cell, the DP 18 checks whether Buffer_Counter 32 equals or exceeds Buffer_Limit 30, which would be an indication that there are no buffers available for receipt of the data cell. If Buffer_Counter>=Buffer_Limit, the data cell is discarded (FIG. 3B). Otherwise, the DP 18 increments Buffer_Counter 32 and Rx_Counter 40 and the data cell is deposited in a buffer cell 28, as in FIG. 4. The Tx_Counter 26 and the Rx_Counter 40 roll over when they reach their maximum.

If flow control is not enabled, none of the presently described functionality is implemented. Connections that do not utilize flow control on the link can coexist with connections using link flow control. The flow control accounting is not employed when cells from non-flow controlled connections are transmitted and received. This includes both connection level accounting and link level accounting. Thereby, flow control and non-flow control connections can be active simultaneously.

When a data cell is forwarded out of the receiver element 14, Buffer_Counter 32 is decremented. Buffer_Counter 32 should never exceed Buffer_Limit 30 when the connection-level flow control protocol is enabled, with the exception of when BS_Limit 24 has been decreased and the receiver element 14 has yet to forward sufficient cells to bring Buffer_Counter 32 below Buffer_Limit 30.

A buffer state update occurs when the receiver element 14 has forwarded a number of data cells equal to N2_Limit 34 out of the receiver element 14. In the first embodiment in which the DP 18 maintains Fwd_Counter 38, update involves the transfer of the value of Fwd_Counter 38 from the receiver element 14 back to the transmitter element 12 in an update cell, as in FIG. 6A. In the embodiment employing Rx_Counter 40 in the downstream element 14, the value of Rx_Counter 40 minus Buffer_Counter 32 is conveyed in the update cell, as in FIG. 5A. At the transmitter 12, the update cell is used to update the value in BS_Counter 22, as shown for the two embodiments in FIG. 7A. Since BS_Counter 22 is independent of buffer allocation information, buffer allocation can be changed without impacting the performance of this aspect of connection-level flow control.

Update cells require an allocated bandwidth to ensure a bounded delay. This delay needs to be accounted for, as a component of round-trip time, to determine the buffer allocation for the respective connection.

The amount of bandwidth allocated to the update cells is a function of a counter, Max_Update_Counter (not illustrated) at an associated downstream transmitter element (not illustrated). This counter forces the scheduling of update and check cells, the latter to be discussed subsequently. There is a corresponding Mim_Update_Interval counter (not shown) in the downstream transmitter element, which controls the space between update cells. Normal cell packing is seven records per cell, and Mim_Update_Interval is similarly set to seven. Since the UP 16 can only process one update record per cell time, back-to-back, fully packed update cells received at the UP 16 would cause some records to be dropped.

Figure 5A:
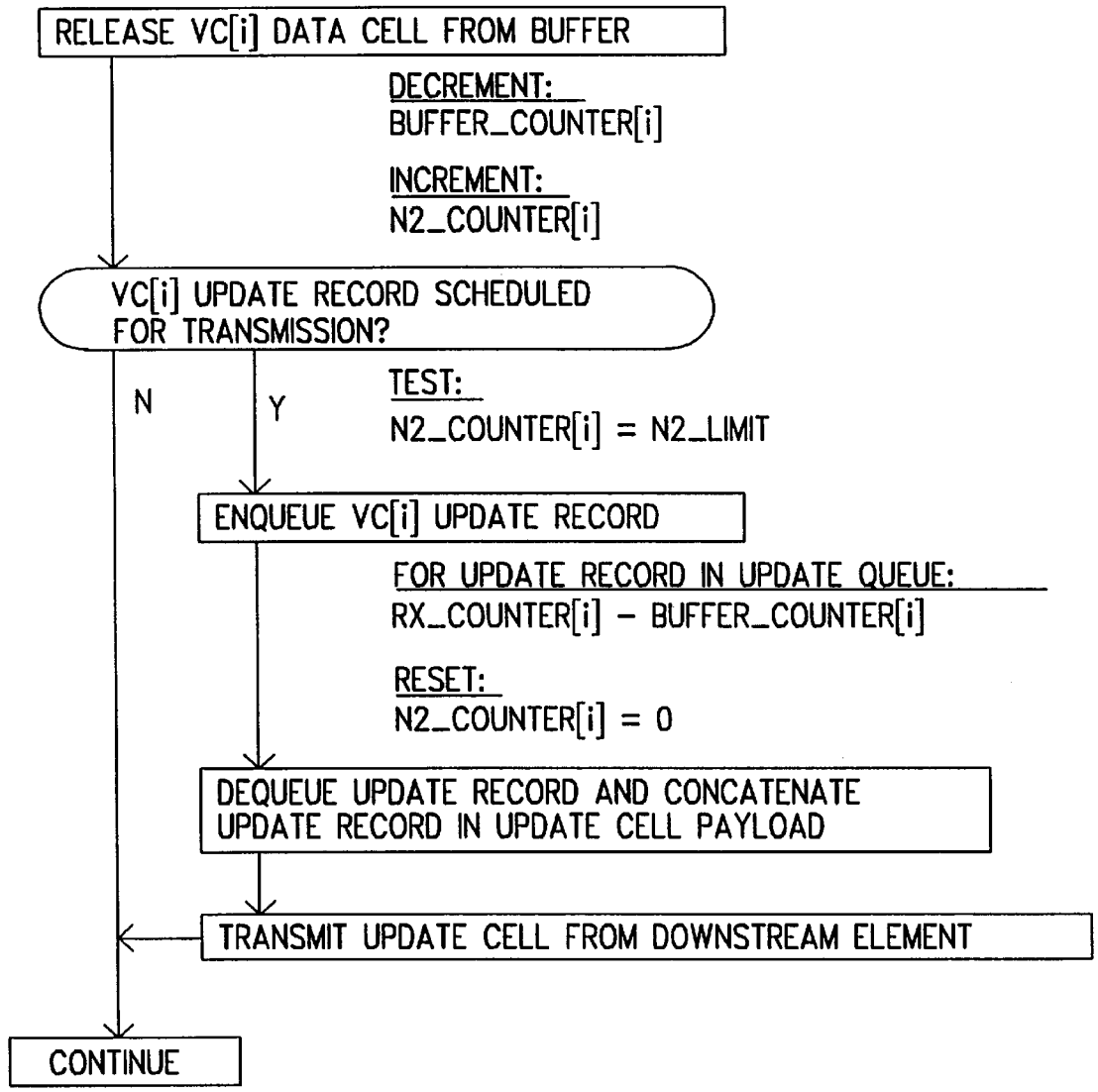
FIGS. 5A and 5B are flow diagram representations of update cell preparation and transmission within the flow control method according to the present invention.
Figure 6A:
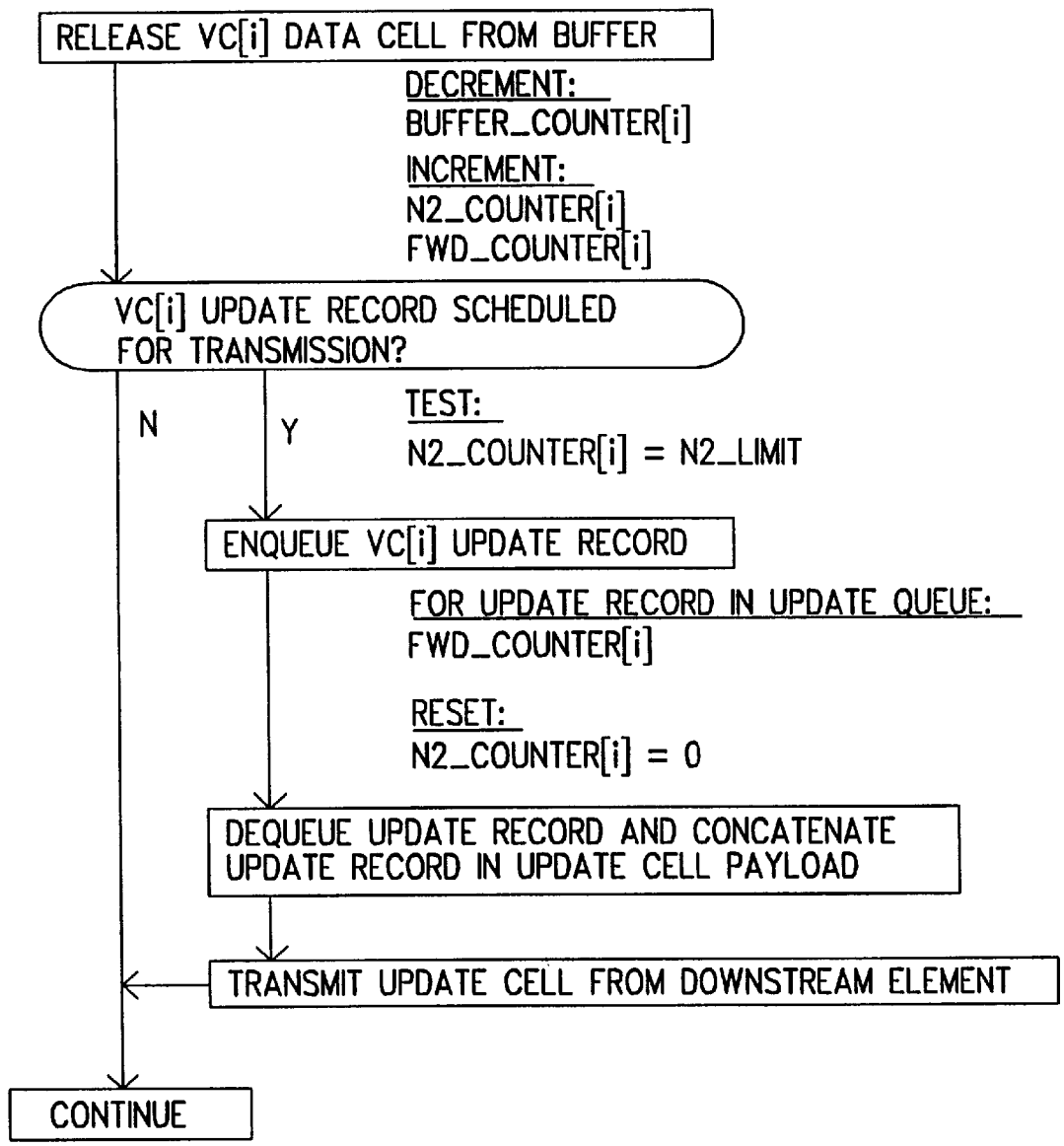
FIGS. 6A and 6B are flow diagram representations of an alternative embodiment of the update cell preparation and transmission of FIGS. 5A and 5B.

An update event occurs as follows, with regard to FIGS. 1, 5A and 6A. When the downstream element 14 forwards (releases) a cell, Buffer_Counter 32 is decremented and N2_Counter 36 and Fwd_Counter 38 are incremented. When the N2_Counter 36 is equal to N2_Limit 34, the DP 18 prepares an update cell for transmission back to the upstream element 12 and N2_Counter 36 is set to zero. The upstream element 12 receives a connection indicator from the downstream element 14 forwarded cell to identify which connection 20 is to be updated. In the first embodiment, the DP 18 causes the Fwd_Counter 38 value to be inserted into an update record payload (FIG. 6A). In the second embodiment, the DP 18 causes the RX_Counter 40 value minus the Buffer_Counter 32 value to be inserted into the update record payload (FIG. 5A). When an update cell is fully packed with records, or as the minimum bandwidth pacing interval is reached, the update cell is transmitted to the upstream element 12.

Figure 7A:
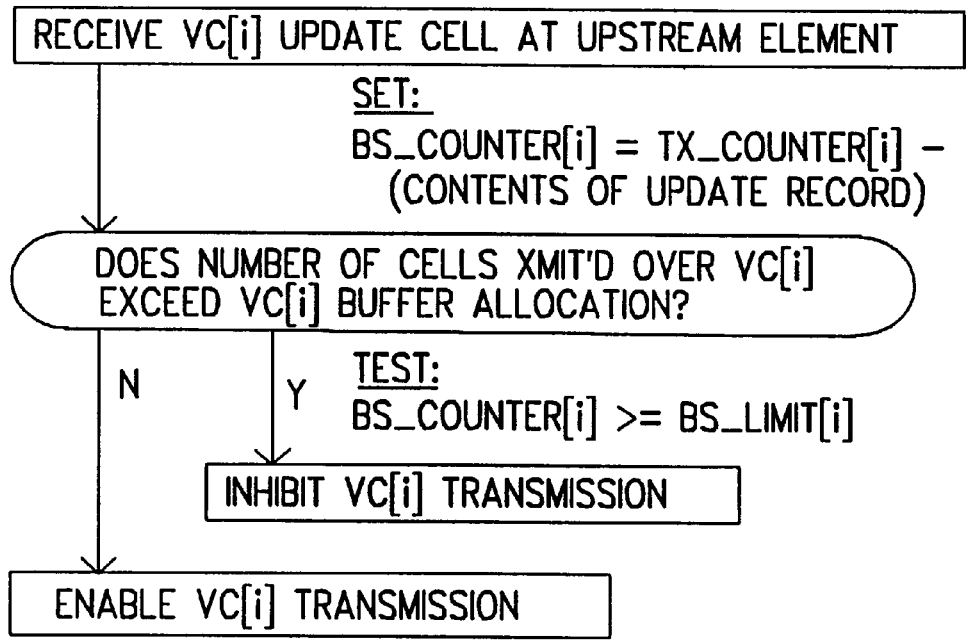
FIGS. 7A and 7B are flow diagram representations of update cell reception within the flow control method according to the present invention.

Once received upstream, the UP 16 receives the connection indicator from the update record to identify the transmitter connection, and extracts the Fwd_Counter 38 value or the Rx_Counter 40 minus Buffer_Counter 32 value from the update record. BS_Counter 22 is reset to the value of Tx_Counter 26 minus the update record value (FIG. 7A). If this connection was disabled from transmitting due to BS_Counter 22 being equal to or greater than BS_Limit 24, this condition should now be reversed, and if so the connection should again be enabled for transmitting.

In summary, the update event provides the transmitting element 12 with an indication of how many cells originally transmitted by it have now been released from buffers within the receiving element 14, and thus provides the transmitting element 12 with a more accurate indication of receiver element 14 buffer 28 availability for that connection 20.

The buffer state check event. serves two purposes: 1) it provides a mechanism to calculate and compensate for cell loss or cell insertion due to transmission errors; and 2) it provides a mechanism to start (or restart) a flow if update cells were lost or if enough data cells were lost that N2_Limit 34 is never reached.

One timer (not shown) in the UP subsystem 16 serves all connections. The connections are enabled or disabled on a per connection basis as to whether to send check cells from the upstream transmitter element 12 to the downstream receiver element 14. The check process in the transmitter element 12 involves searching all of the connection descriptors to find one which is check enabled (see FIGS. 8A, 9A). Once a minimum pacing interval has elapsed (the check interval), the check cell is forwarded to the receiver element 14 and the next check enabled connection is identified. The spacing between check cells for the same connection is a function of the number of active flow-controlled connections times the mandated spacing between check cells for all connections. Check cells have priority over update cells.

Figure 8A:
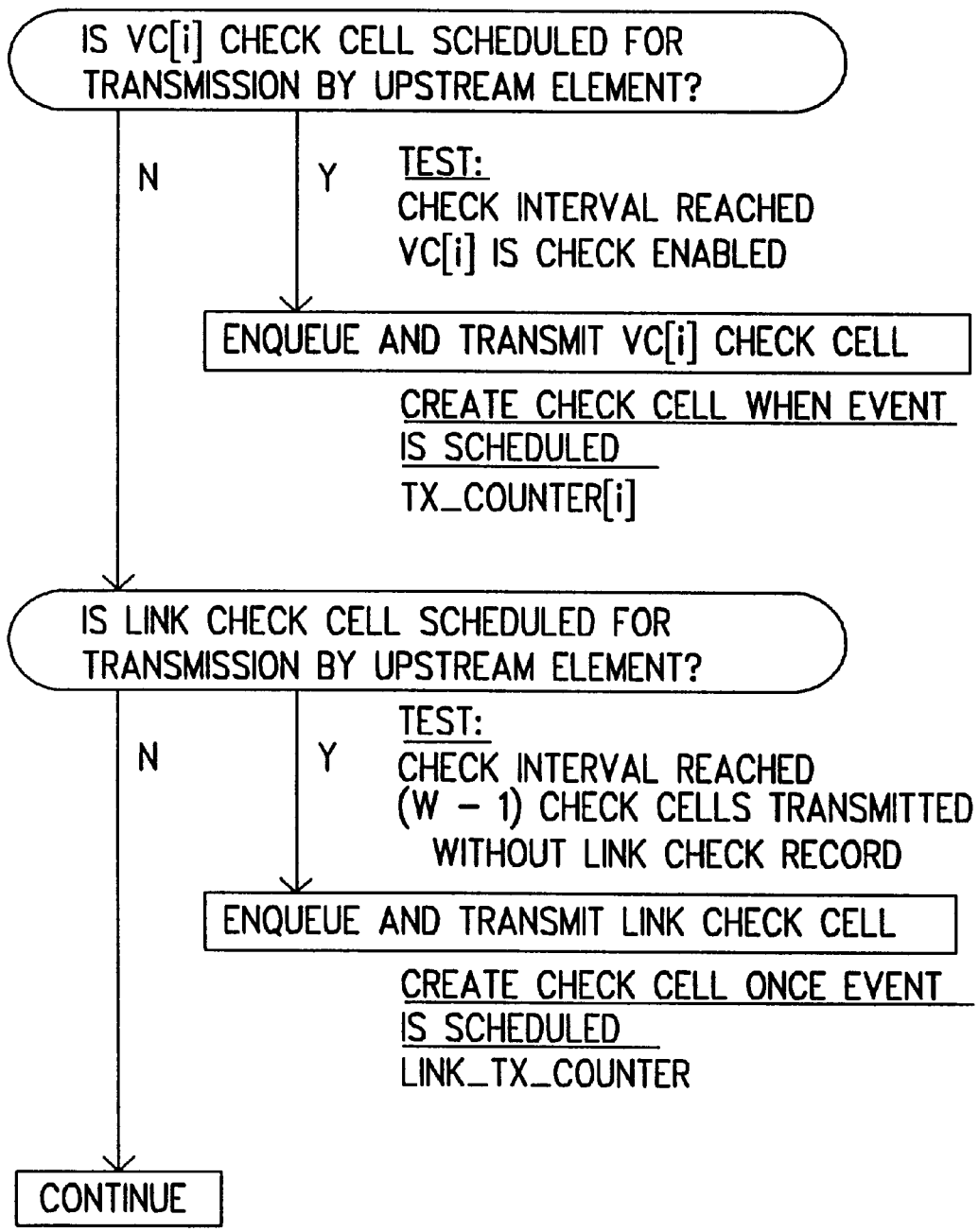
FIGS. 8A, 8B and 8C are flow diagram representations of check cell preparation, transmission and reception within the flow control method according to the present invention.

The check event occurs as follows, with regard to FIGS. 8A through 8C and 9A through 9C. Each transmit element 12 connection 20 is checked after a timed check interval is reached. If the connection is flow-control enabled and the connection is valid, then a check event is scheduled for transmission to the receiver element 14. A buffer state check cell is generated using the Tx_Counter 26 value for that connection 20 in the check cell payload, and is transmitted using the connection indicator from the respective connection descriptor (FIGS. 8A and 9A).

Figure 9A:
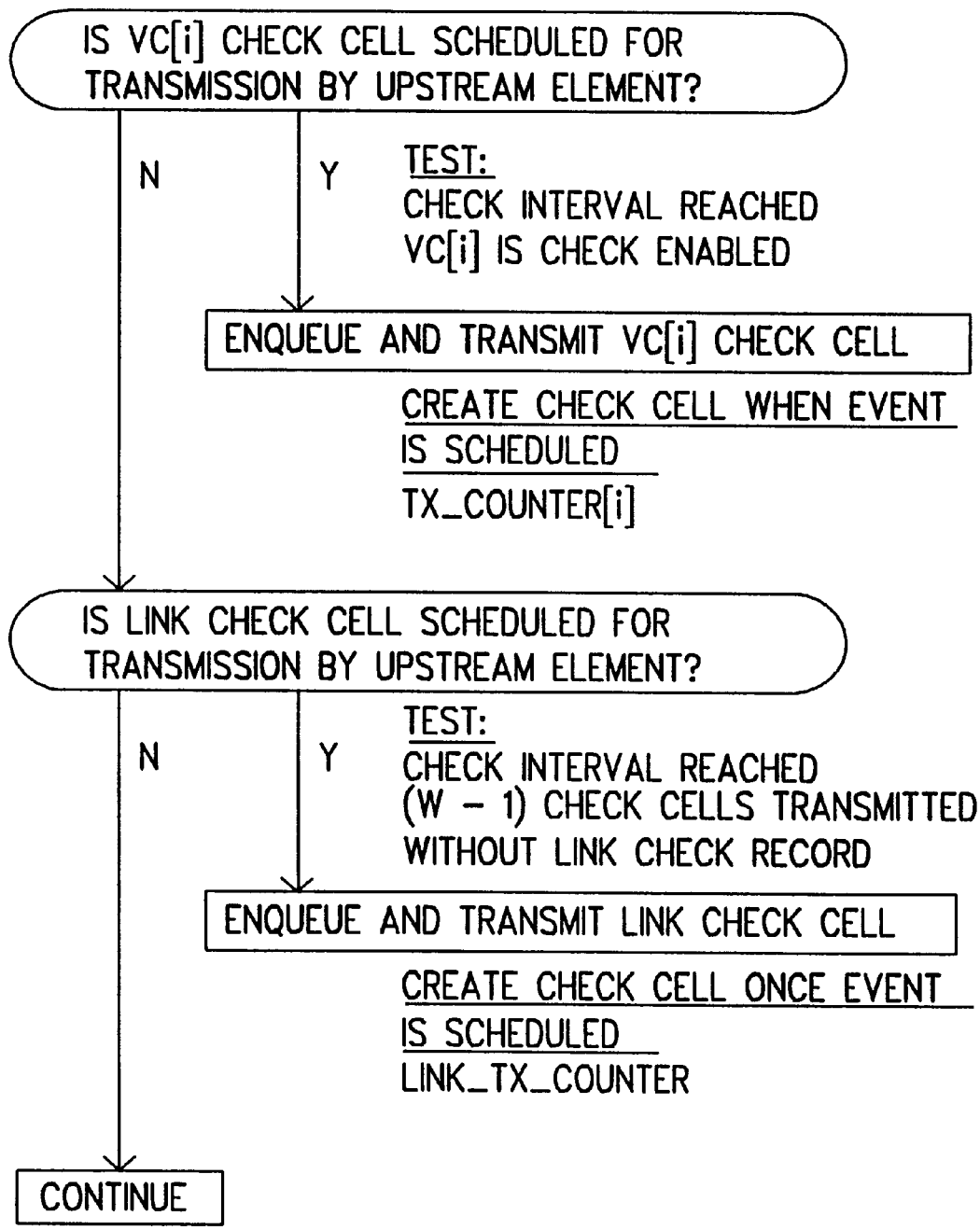
FIGS. 9A, 9B and 9C are flow diagram representations of an alternative embodiment of the check cell preparation, transmission and reception of FIGS. 8A, 8B and 8C.
Figure 9B:
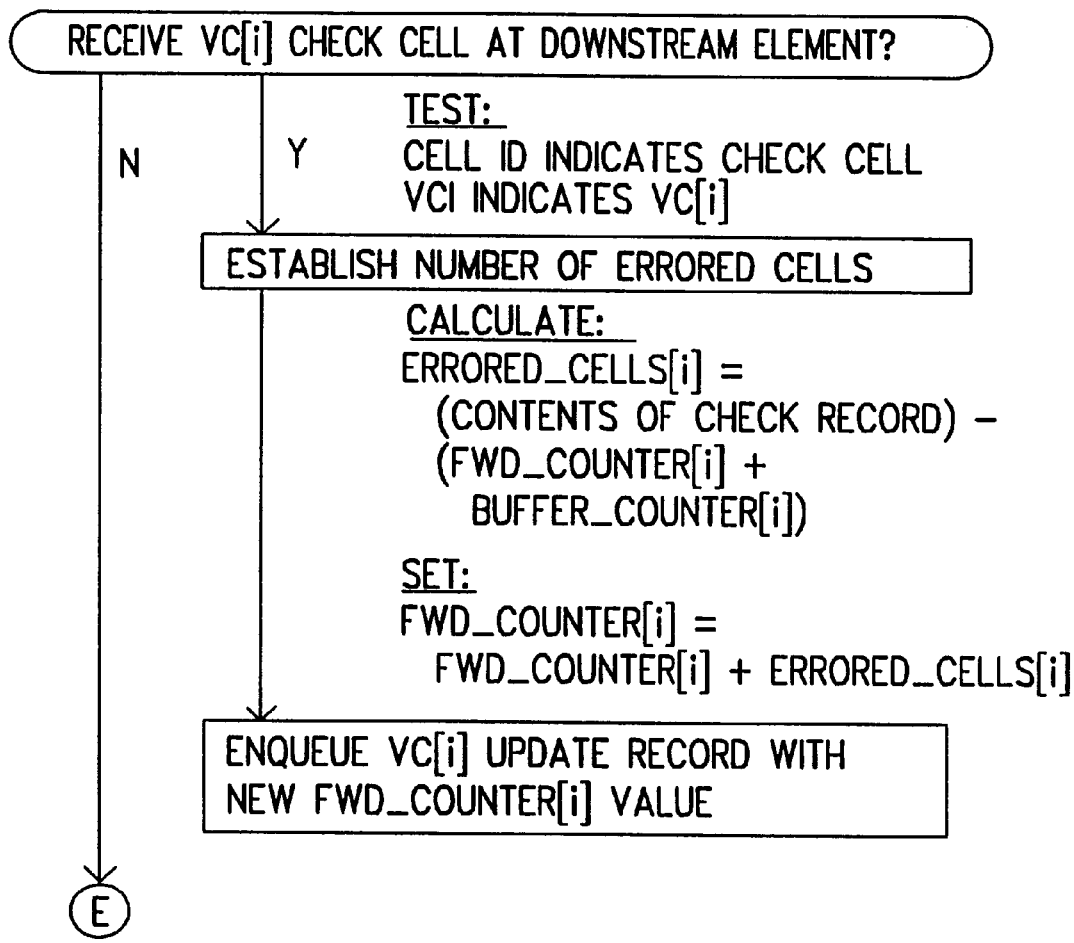

In the first embodiment, a calculation of errored cells is made at the receiver element 14 by summing Fwd_Counter 38 with Buffer_Counter 32, and subtracting this value from the contents of the transmitted check cell record, the value of Tx_Counter 26 (FIG. 9B). The value of Fwd_Counter 38 is increased by the errored cell count. An update record with the new value for Fwd_Counter 38 is then generated. This updated Fwd_Counter 38 value subsequently updates the BS_Counter 22 value in the transmitter element 12.

Figure 8B:
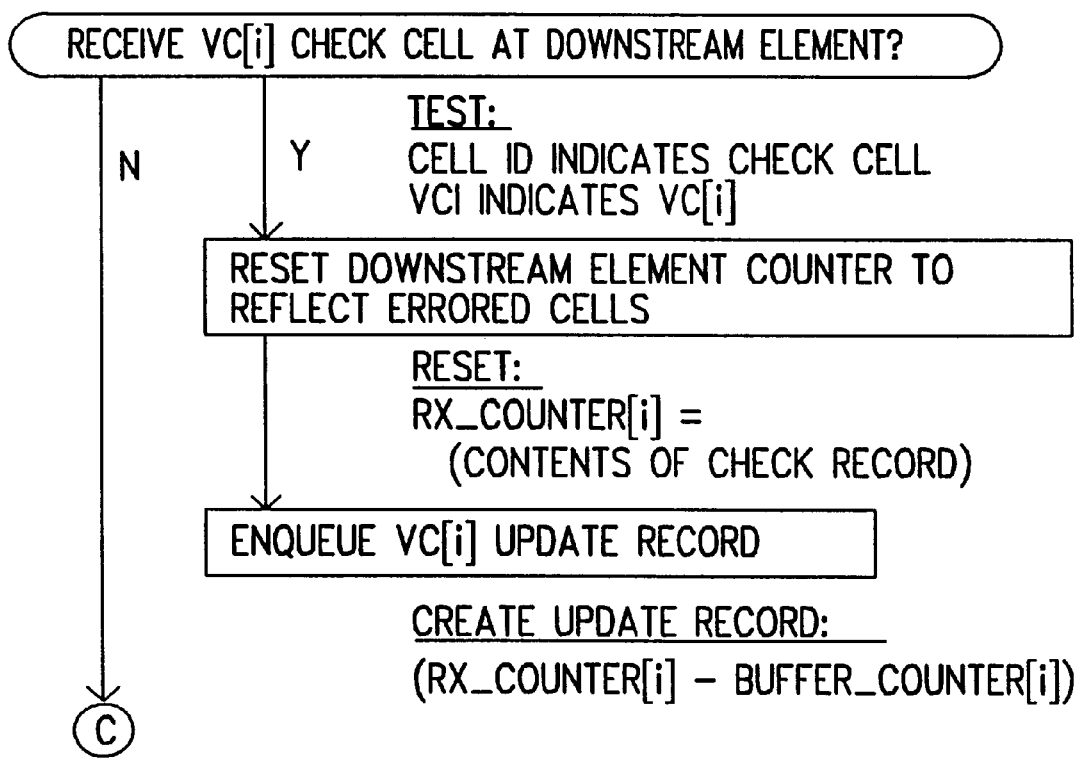

In the second embodiment, illustrated in FIG. 8B, the same is accomplished by resetting the Rx_Counter 40 value equal to the check cell payload value (Tx_Counter 26). A subsequent update record is established using the difference between the values of Rx_Counter 40 and Buffer_Counter 32.

Thus, the check event enables accounting for cells transmitted by the transmitter element 12, through the connection 20, but either dropped or not received by the receiver element 14.

A "no cell loss" guarantee is enabled using buffer state accounting at the connection level since the transmitter element 12 has an up-to-date account of the number of buffers 28 in the receiver element 14 available for receipt of data cells, and has an indication of when data cell transmission should be ceased due to the absence of available buffers 28 downstream.

In order to augment the foregoing protocol with a receiver element buffer sharing mechanism, link-level flow control, also known as link-level buffer state accounting, is added to connection-level flow control. It is possible for such link-level flow control to be implemented without connection-level flow control. However, a combination of the two is preferable since without connection-level flow control there would be no restriction on the number of buffers a single connection might consume.

It is desirable to perform buffer state accounting at the link level, in addition to the connection level, for the following reasons. Link-level flow control enables cell buffer sharing at a receiver element while maintaining the "no cell loss" guarantee afforded by connection-level flow control. Buffer sharing results in the most efficient use of a limited number of buffers. Rather than provide a number of buffers equal to bandwidth times RTT for each connection, a smaller number of buffers is employable in the receiver element 14 since not all connections require a full compliment of buffers at any one time.

A further benefit of link-level buffer state accounting is that each connection is provided with an accurate representation of downstream buffer availability without necessitating increased reverse bandwidth for each connection. A high-frequency link-level update does not significantly effect overall per-connection bandwidth.

Figure 2:
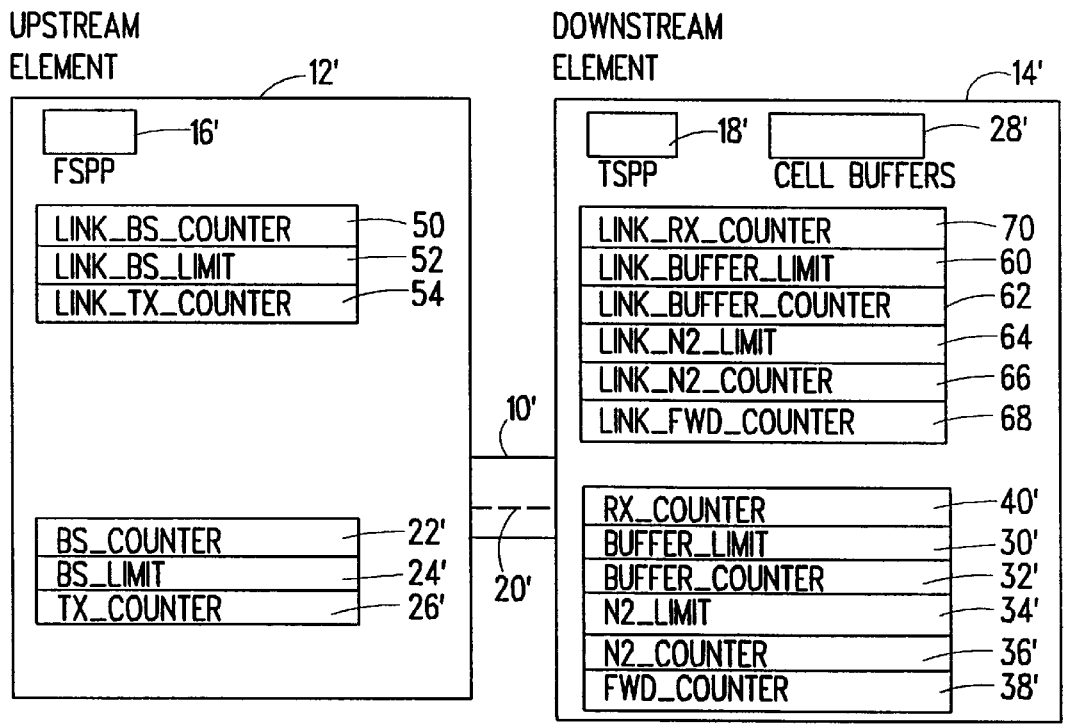
FIG. 2 is a block diagram of a link-level flow control apparatus according to the present invention.

Link-level flow control is described now with regard to FIG. 2. Like elements found in FIG. 1 are given the same reference numbers in FIG. 2, with the addition of a prime. Once again, only one virtual connection 20' is illustrated in the link 10', though the link 10' would normally host multiple virtual connections 20'. Once again, the link 10' is a physical link in a first embodiment, and a logical grouping of plural virtual connections in a second embodiment.

The upstream transmitter element 12' (FSPP subsystem) partially includes a processor labelled From Switch Port Processor (FSPP) 16'. The FSPP processor 16' is provided with two buffer state counters, BS_Counter 22' and BS_Limit 24', and a Tx_Counter 26' each having the same function on a per-connection basis as those described with respect to FIG. 1.

The embodiment of FIG. 2 further includes a set of resources added to the upstream and downstream elements 12', 14' which enable link-level buffer accounting. These resources provide similar functions as those utilized on a per-connection basis, yet they operate on the link level.

For instance, Link_BS_Counter 50 tracks all cells in flight between the FSPP 16' and elements downstream of the receiver element 14', including cells in transit between the transmitter 12' and the receiver 14' and cells stored within receiver 14' buffers 28'. As with the update event described above with respect to connection-level buffer accounting, Link_BS_Counter 50 is modified during a link update event by subtracting either the Link_Fwd_Counter 68 value or the difference between Link_Rx_Counter 70 and Link_Buffer_Counter 62 from the Link_TX_Counter 54 value. In a first embodiment, the link-level counters are implemented in external RAM associated with the FSPP processor 16'.

Link_BS_Limit 52 limits the number of shared downstream cell buffers 28' in the receiver element 14' to be shared among all of the flow-control enabled connections 20'. In a first embodiment, Link_BS_Counter 50 and Link_BS_Limit 52 are both twenty bits wide.

Link_TX_Counter 54 tracks all cells transmitted onto the link 10'. It is used during the link-level update event to calculate a new value for Link_BS_Counter 50. Link_TX_Counter 54 is twenty-eight bits wide in the first embodiment.

In the downstream element 14', To Switch Port Processor (TSPP) 18' also manages a set of counters for each link 10' in the same fashion with respect to the commonly illustrated counters in FIGS. 1 and 2. The TSPP 18' further includes a Link_Buffer_Limit 60 which performs a function in the downstream element 14' similar to Link_BS_Limit 52 in the upstream element 12' by indicating the maximum number of cell buffers 28' in the receiver 14' available for use by all connections 10'. In most cases, Link_BS_Limit 52 is equal to Link_Buffer_Limit 60. The effect of adjusting the number of buffers 28' available up or down on a link-wide basis is the same as that described above with respect to adjusting the number of buffers 28 available for a particular connection 20. Link_Buffer_Limit 60 is twenty bits wide in the first embodiment.

Link_Buffer_Counter 62 provides an indication of the number of buffers in the downstream element 14' which are currently being used by all connections for the storage of data cells. This value is used in a check event to correct the Link_Fwd_Counter 68 (described subsequently). The Link_Buffer_Counter 62 is twenty bits wide in the first embodiment.

Link_N2_Limit 64 and Link_N2_Counter 66, each eight bits wide in the first embodiment, are used to generate link update records, which are intermixed with connection-level update records. Link_N2_Limit 64 establishes a threshold number for triggering the generation of a link-level update record (FIGS. 5B and 6B), and Link_N2_Counter 66 and Link_Fwd_Counter 68 are incremented each time a cell is released out of a buffer cell in the receiver element 14'. In a first embodiment, N2_Limit 34' and Link_N2_Limit 64 are both static once initially configured.

However, in a further embodiment of the present invention, each is dynamically adjustable based upon measured bandwidth. For instance, if forward link bandwidth is relatively high, Link_N2_Limit 64 could be adjusted down to cause more frequent link-level update record transmission. Any forward bandwidth impact would be considered minimal. Lower forward bandwidth would enable the raising of Link_N2_Limit 64 since the unknown availability of buffers 28' in the downstream element 14' is less critical.

Link_Fwd_Counter 68 tracks all cells released from buffer cells 28' in the receiver element 14' that came from the link 10' in question. It is twenty-eight bits wide in a first embodiment, and is used in the update event to recalculate Link_BS_Counter 50.

Link_Rx_Counter 70 is employed in an alternative embodiment in which Link_Fwd_Counter 68 is not employed. It is also twenty-eight bits wide in an illustrative embodiment and tracks the number of cells received across all connections 20' in the link 10'.

With regard to FIGS. 2 et seq., a receiver element buffer sharing method is described. Normal data transfer by the FSPP 16' in the upstream element 12' to the TSPP 18' in the downstream element 14' is enabled across all connections 20' in the link 10' as long as the Link_BS_Counter 50 is less than or equal to Link_BS_Limit 52, as in FIG. 3B. This test prevents the FSPP 16' from transmitting more data cells than it believes are available in the downstream element 14'. The accuracy of this belief is maintained through the update and check events, described next.

A data cell is received at the downstream element 14' if neither connection-level or link-level buffer limit are exceeded (FIG. 3B). If a limit is exceeded, the cell is discarded.

Figure 5B:
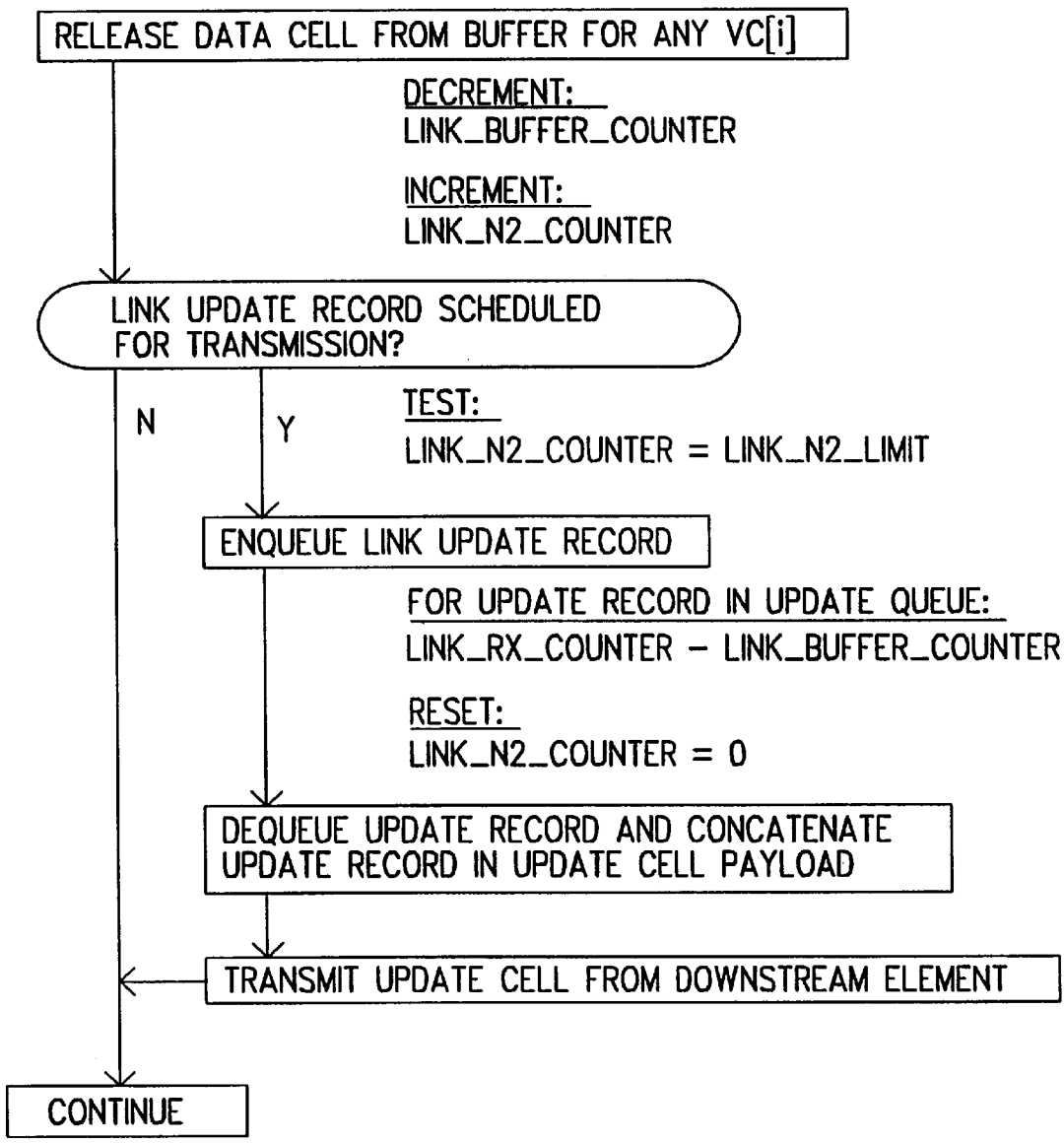
Figure 6B:
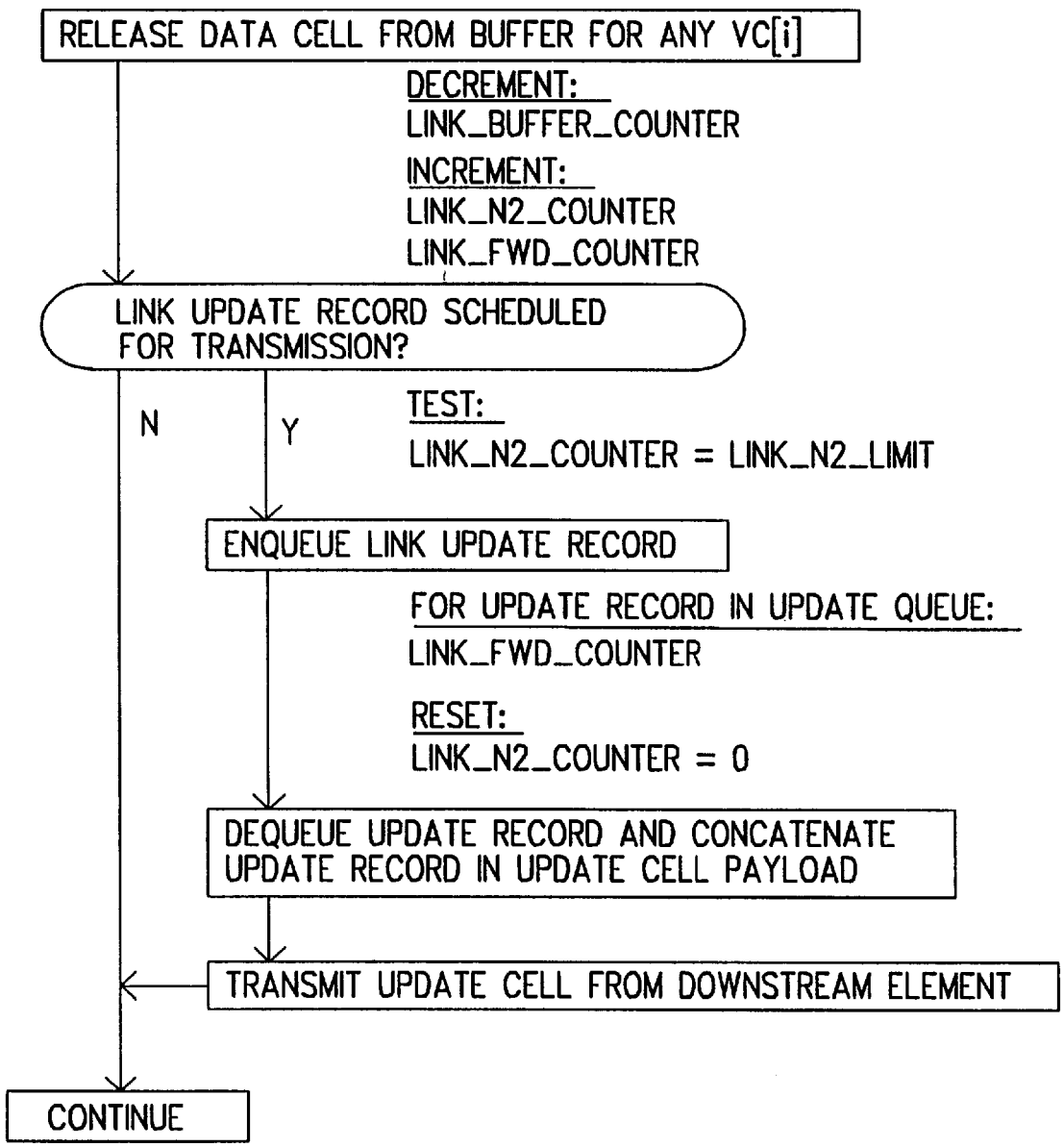

The update event at the link level involves the generation of a link update record when the value in Link_N2_Counter 66 reaches (equals or exceeds) the value in Link_N2_Limit 64, as shown in FIGS. 5B and 6B. In a first embodiment, Link_N2_Limit 64 is set to forty.

Figure 7B:
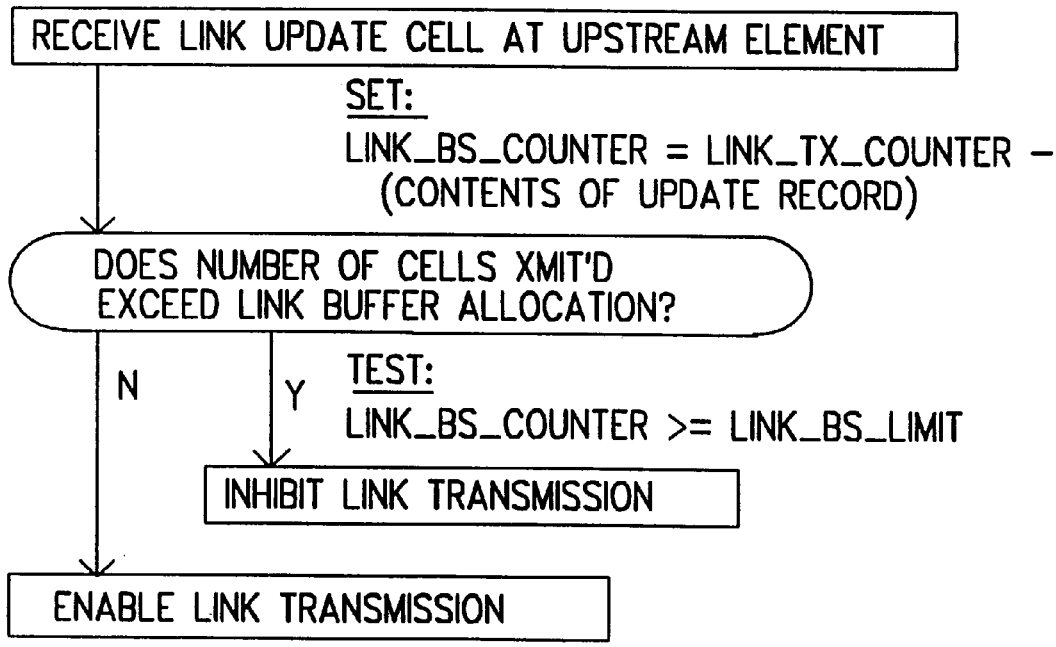

The link update record, the value taken from Link_Fwd_Counter 68 in the embodiment of FIG. 6B, is mixed with the per-connection update records (the value of Fwd_Counter 38') in update cells transferred to the FSPP 16'. In the embodiment of FIG. 5B, the value of Link_Rx_Counter 70 minus Link_Buffer_Counter 62 is mixed with the per-connection update records. When the upstream element 12' receives the update cell having the link update record, it sets the Link_BS_Counter 50 equal to the value of Link_Tx_Counter 54 minus the value in the update record (FIG. 7B). Thus, Link_BS_Counter 50 in the upstream element 12' is reset to reflect the number of data cells transmitted by the upstream element 12', but not yet released in the downstream element 14'.

The actual implementation of the transfer of an update record, in a first embodiment, recognizes that for each TSPP subsystem 14', there is an associated FSPP processor (not illustrated), and for each FSPP subsystem 12', there is also an associated TSPP processor (not illustrated). Thus, when an update record is ready to be transmitted by the TSPP subsystem 14' back to the upstream FSPP subsystem 12', the TSPP 18' conveys the update record to the associated FSPP (not illustrated), which constructs an update cell. The cell is conveyed from the associated FSPP to the TSPP (not illustrated) associated with the upstream FSPP subsystem 12'. The associated TSPP strips out the update record from the received update cell, and conveys the record to the upstream FSPP subsystem 12'.

Figure 8C:
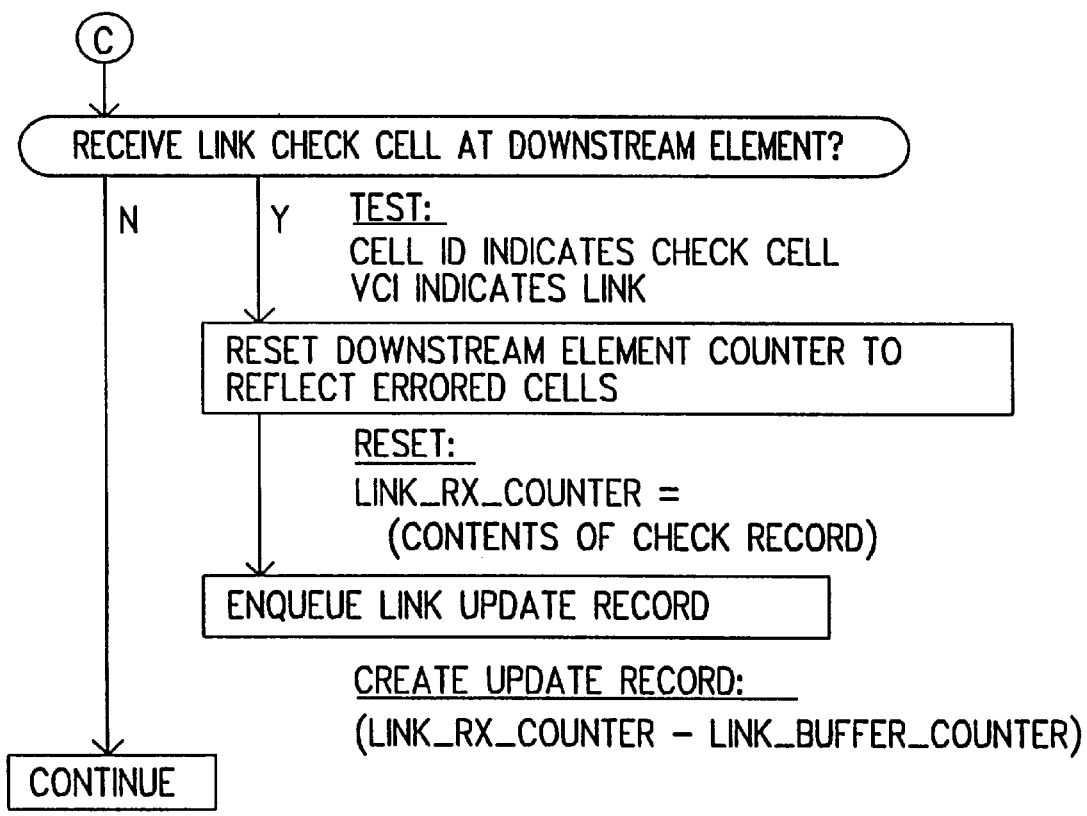
Figure 9C:
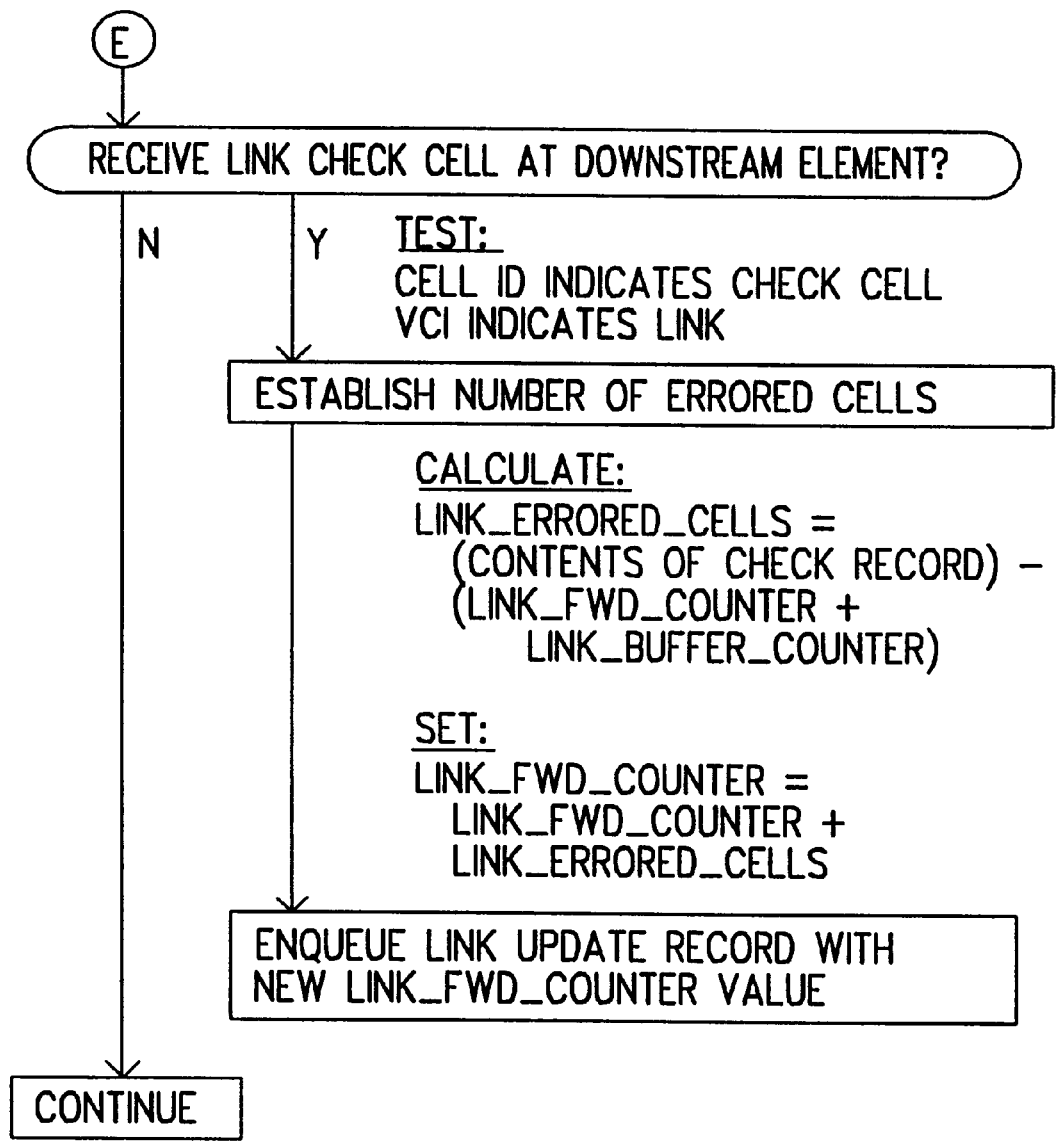

The check event at the link level involves the transmission of a check cell having the Link_Tx_Counter 54 value by the FSPP 16' every "W" check cells (FIGS. 8A and 9A). In a first embodiment, W is equal to four. At the receiver element 14', the TSPP 18' performs the previously described check functions at the connection-level, as well as increasing the Link_Fwd_Counter 68 value by an amount equal to the check record contents, Link_Tx_Counter 54, minus the sum of Link_Buffer_Counter 62 plus Link_Fwd_Counter 68 in the embodiment of FIG. 9C. In the embodiment of FIG. 8C, Link_Rx_Counter 70 is modified to equal the contents of the check record (Link_Tx_Counter 54). This is an accounting for errored cells on a link-wide basis. An update record is then generated having a value taken from the updated Link_Fwd_Counter 68 or Link_Rx_Counter 70 values (FIGS. 8C and 9C).

It is necessary to perform the check event at the link level in addition to the connection level in order to readjust the Link_Fwd_Counter 68 value (FIG. 9C) or Link_Rx_Counter 70 value (FIG. 8C) quickly in the case of large transient link failures.

Again with regard to FIG. 2, the following are exemplary initial values for the illustrated counters in an embodiment having 100 connections in one link.

| | |
|---|---|
| BS_Limit | (24') = 20 |
| Buffer_Limit | (30') = 20 |
| N2_Limit | (34') = 3 |
| Link_BS_Limit | (52) = 1000 |
| Link_Buffer_Limit | (60) = 1000 |
| Link_N2_Counter | (66) = 40 |

The BS_Limit value equals the Buffer_Limit value for both the connections and the link. Though BS_Limit 24' and Buffer_Limit 30' are both equal to twenty, and there are 100 connections in this link, there are only 1000 buffers 28' in the downstream element, as reflected by Link_BS_Limit 52 and Link_Buffer_Limit 60. This is because of the buffer pool sharing enabled by link-level feedback.

Link-level flow control can be disabled, should the need arise, by not incrementing: Link_BS_Counter; Link_N2_Counter; and Link_Buffer_Counter, and by disabling link-level check cell transfer. No updates will occur under these conditions.

The presently described invention can be further augmented with a dynamic buffer allocation scheme, such as previously described with respect to N2_Limit 34 and Link_N2_Limit 64. This scheme includes the ability to dynamically adjust limiting parameters such as BS_Limit 24, Link_BS_Limit 52, Buffer_Limit 30, and Link_Buffer_Limit 60, in addition to N2_Limit 34 and Link_N2_Limit 64. Such adjustment is in response to measured characteristics of the individual connections or the entire link in one embodiment, and is established according to a determined priority scheme in another embodiment. Dynamic buffer allocation thus provides the ability to prioritize one or more connections or links given a limited buffer resource.

The Link_N2_Limit is set according to the desired accuracy of buffer accounting. On a link-wide basis, as the number of connections within the link increases, it may be desirable to decrease Link_N2_Limit in light of an increased number of connections in the link, since accurate buffer accounting allows greater buffer sharing among many connections. Conversely, if the number of connections within the link decreases, Link_N2_Limit may be increased, since the criticality of sharing limited resources among a relatively small number of connections is decreased.

In addition to adjusting the limits on a per-link basis, it may also be desirable to adjust limits on a per-connection basis in order to change the maximum sustained bandwidth for the connection.

The presently disclosed dynamic allocation schemes are implemented during link operation, based upon previously prescribed performance goals.

In a first embodiment of the present invention, incrementing logic for all counters is disposed within the FSPP processor 16'. Related thereto, the counters previously described as being reset to zero and counting up to a limit can be implemented in a further embodiment as starting at the limit and counting down to zero. The transmitter and receiver processors interpret the limits as starting points for the respective counters, and decrement upon detection of the appropriate event. For instance, if Buffer_Counter (or Link_Buffer_Counter) is implemented as a decrementing counter, each time a data cell is allocated to a buffer within the receiver, the counter would decrement. When a data cell is released from the respective buffer, the counter would increment. In this manner, the counter reaching zero would serve as an indication that all available buffers have been allocated. Such implementation is less easily employed in a dynamic bandwidth allocation scheme since dynamic adjustment of the limits must be accounted for in the non-zero counts.

A further enhancement of the foregoing zero cell loss, link-level flow control technique includes providing a plurality of shared cell buffers 28" in a downstream element 14" wherein the cell buffers 28" are divided into N prioritized cell buffer subsets, Priority 0 108a, Priority 1 108b, Priority 2 108c, and Priority 3 108d, by N-1 threshold level(s), Threshold(1) 102, Threshold(2) 104, and Threshold(3) 106. Such a cell buffer pool 28" is illustrated in FIG. 10, in which four priorities labelled Priority 0 through Priority 3 are illustrated as being defined by three thresholds labelled Threshold(1) through Threshold(3).

This prioritized buffer pool enables the transmission of high priority connections while lower priority connections are "starved" or prevented from transmitting cells downstream during periods of link congestion. Cell priorities are identified on a per-connection basis. The policy by which the thresholds are established is defined according to a predicted model of cell traffic in a first embodiment, or, in an alternative embodiment, is dynamically adjusted. Such dynamic adjustment may be in response to observed cell traffic at an upstream transmitting element, or according to empirical cell traffic data as observed at the prioritized buffer pool in the downstream element. For example, in an embodiment employing dynamic threshold adjustment, it may be advantageous to lower the number of buffers available to data cells having a priority less than Priority 0, or conversely to increase the number of buffers above Threshold(3), if a significantly larger quantity of Priority 0 traffic is detected.

Figure 10:
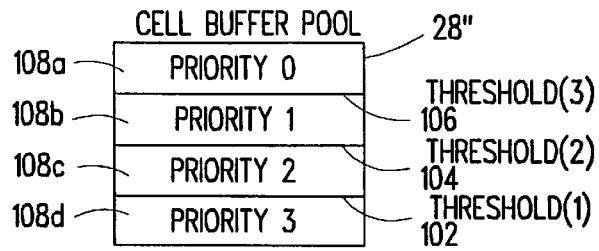
FIG. 10 illustrates a cell buffer pool according to the present invention as viewed from an upstream element.
Figure 11:
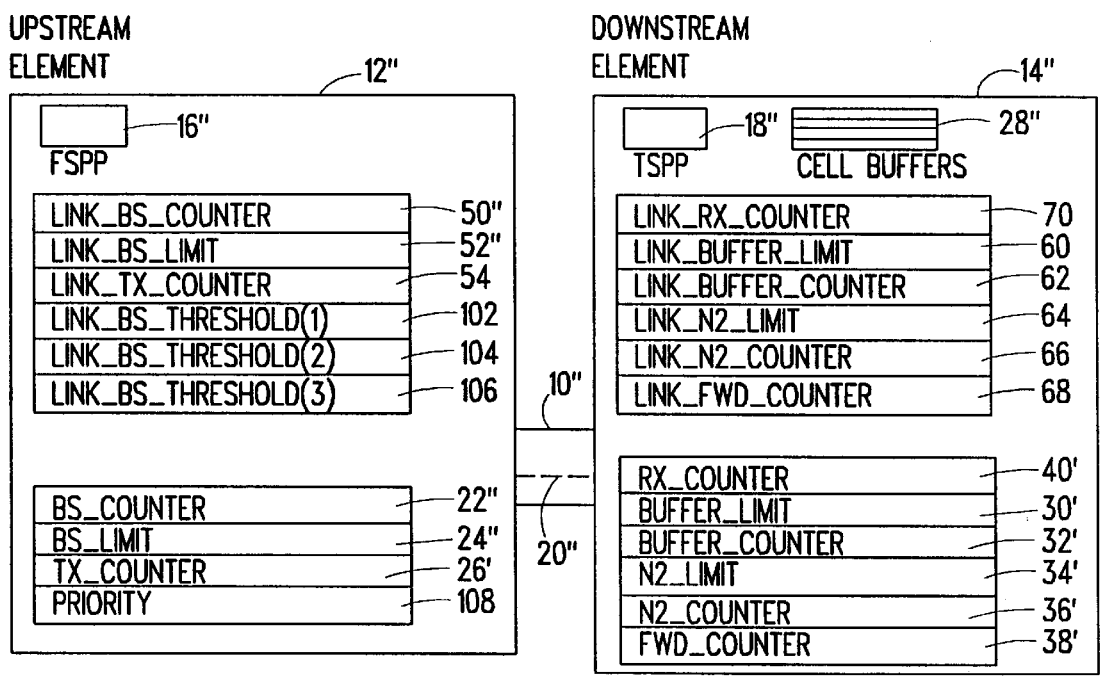
FIG. 11 is a block diagram of a link-level flow control apparatus in an upstream element providing prioritized access to a shared buffer resource in a downstream element according to the present invention.

The cell buffer pool 28" depicted in FIG. 10 is taken from the vantage point of a modified version 12" of the foregoing link-level flow control upstream element 12', the pool 28" being resident within a corresponding downstream element 14". This modified upstream element 12", viewed in FIG. 11, has at least one Link_BS_Threshold(n) 100, 102, 104 established in association with a Link_BS_Counter 50" and Link_BS_Limit 52", as described above, for characterizing a cell buffer pool 28" in a downstream element 14". These Link_BS_Thresholds 102, 104, 106 define a number of cell buffers in the pool 28" which are allocatable to cells of a given priority, wherein the priority is identified by a register 108 associated with the BS_Counter 22" counter and BS_Limit 24" register for each connection 20". The Priorities 108a, 108b, 108c, 108d illustrated in FIG. 11 are identified as Priority 0 through Priority 3, Priority 0 being the highest. When there is no congestion, as reflected by Link_BS_Counter 50" being less than Link_BS_Threshold(1) 102 in FIGS. 10 and 11, flow-controlled connections of any priority can transmit. As congestion occurs, as indicated by an increasing value in the Link_BS_Counter 50", lower priority connections are denied access to downstream buffers, in effect disabling their transmission of cells. In the case of severe congestion, only cells of the highest priority are allowed to transmit. For instance, with respect again to FIG. 10, only cells of Priority 0 108a are enabled for transmission from the upstream element 12" to the downstream element 14" if the link-level Link_BS_Threshold(3) 106 has been reached downstream. Thus, higher priority connections are less effected by the state of the network because they have first access to the shared downstream buffer pool. Note, however, that connection-level flow control can still prevent a high-priority connection from transmitting, if the path that connection is intended for is severely congested.

As above, Link_BS_Counter 50" is periodically updated based upon a value contained within a link-level update record transmitted from the downstream element 14" to the upstream element 12". This periodic updating is required in order to ensure accurate-function of the prioritized buffer access of the present invention. In an embodiment of the present invention in which the Threshold levels 102, 104, 106 are modified dynamically, either as a result of tracking the priority associated with cells received at the upstream transmitter element or based upon observed buffer usage in the downstream receiver element, it is necessary for the FSPP 16" to have an accurate record of the state of the cell buffers 28", as afforded by the update function.

The multiple priority levels enable different categories of service, in terms of delay bounds, to be offered within a single quality of service. Within each quality of service, highest priority to shared buffers is typically given to connection/network management traffic, as identified by the cell header. Second highest priority is given to low bandwidth, small burst connections, and third highest for bursty traffic. With prioritization allocated as described, congestion within any one of the service categories will not prevent connection/management traffic from having the lowest cell delay.

Figure 12A:
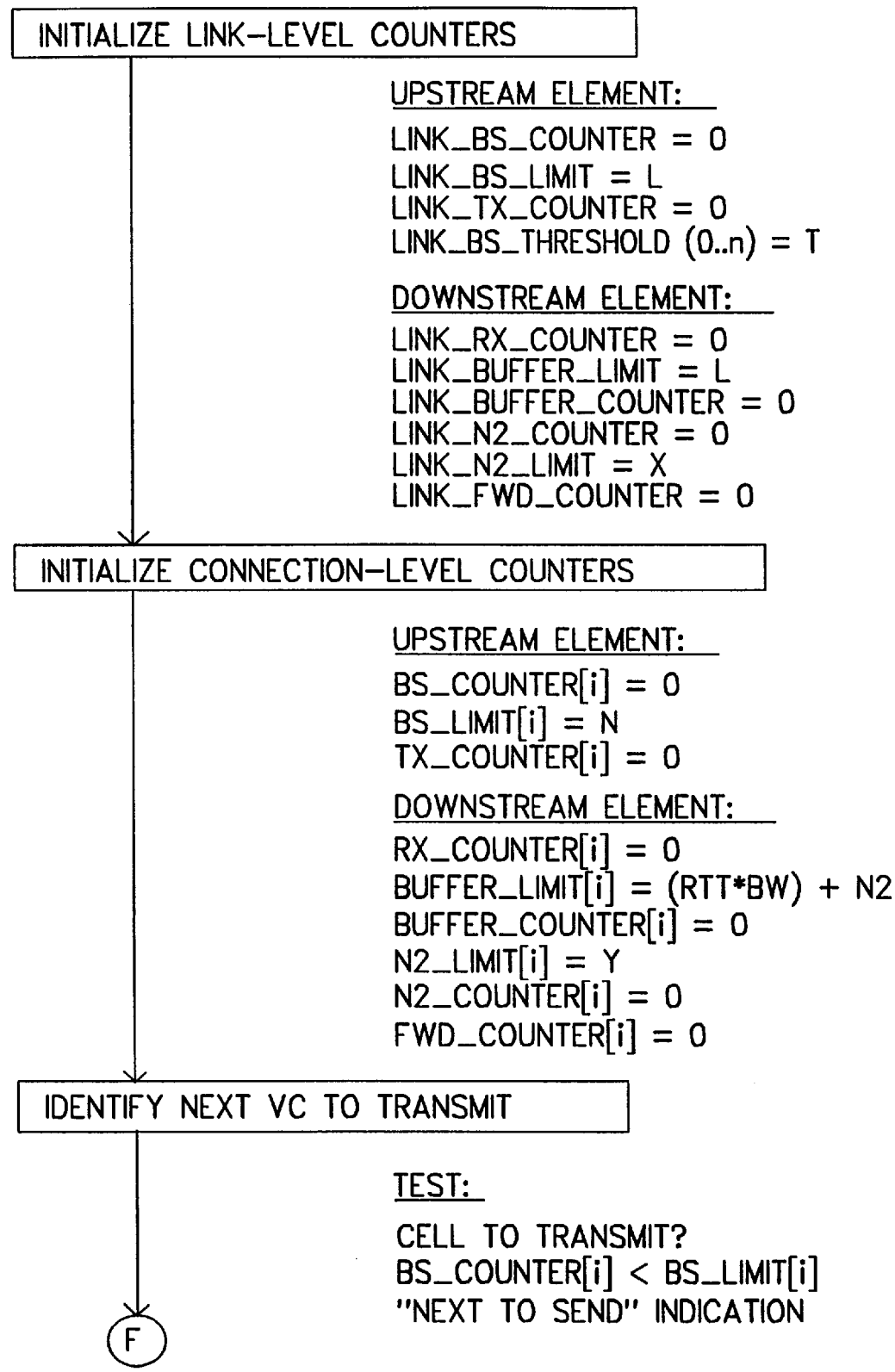
FIGS. 12A and 12B are flow diagram representations of counter initialization and preparation for cell transmission within a prioritized access method according to the present invention.

Initialization of the upstream element 12" as depicted in FIG. 11 is illustrated in FIG. 12A. Essentially, the same counters and registers are set as viewed in FIG. 3A for an upstream element 12' not enabling prioritized access to a shared buffer resource, with the exception that Link_BS_Threshold 102, 104, 106 values are initialized to a respective buffer value T. As discussed, these threshold buffer values can be pre-established and static, or can be adjusted dynamically based upon empirical buffer usage data.

Figure 12B:
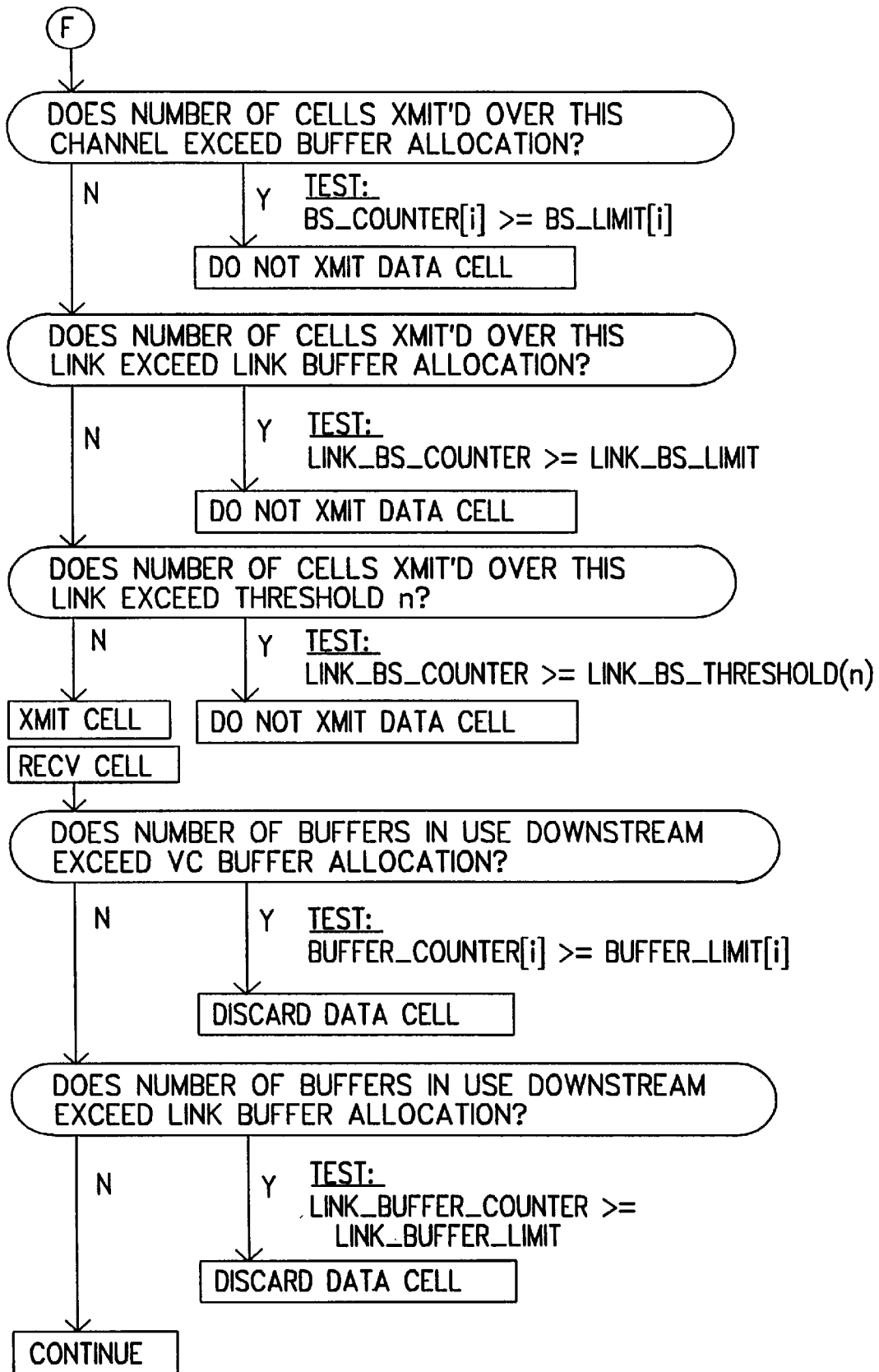

FIG. 12B represents many of the same tests employed prior to forwarding a cell from the upstream element 12" to the downstream element 14" as shown in FIG. 3B, with the exception that an additional test is added for the provision of prioritized access to a shared buffer resource. Specifically, the FSPP 16" uses the priority value 108 associated with a cell to be transferred to determine a threshold value 102, 104, 106 above which the cell cannot be transferred to the downstream element 14". Then, a test is made to determine whether the Link_BS_Counter 50" value is greater than or equal to the appropriate threshold value 102, 104, 106. If so, the data cell is not transmitted. Otherwise, the cell is transmitted and connection-level congestion tests are executed, as previously described.

In alternative embodiments, more or less than four priorities can be implemented with the appropriate number of thresholds, wherein the fewest number of priorities is two, and the corresponding fewest number of thresholds is one. For every N priorities, there are N−1 thresholds.

In yet a further embodiment, flow-control is provided solely at the link level, and not at the connection level, though it is still necessary for each connection to provide some form of priority indication akin to the priority field 108 illustrated in FIG. 11.

The link level flow controlled protocol as previously described can be further augmented in yet another embodiment to enable a guaranteed minimum cell rate on a per-connection basis with zero cell loss. This minimum cell rate is also referred to as guaranteed bandwidth. The connection can be flow-controlled below this minimum, allocated rate, but only by the receiver elements associated with this connection. Therefore, the minimum rate of one connection is not affected by congestion within other connections.

It is a requirement of the presently disclosed mechanism that cells present at the upstream element associated with the FSPP 116 be identified by whether they are to be transmitted from the upstream element using allocated bandwidth, or whether they are to be transmitted using dynamic bandwidth. For instance, the cells may be provided in queues associated with a list labelled "preferred," indicative of cells requiring allocated bandwidth. Similarly, the cells may be provided in queues associated with a list labelled "dynamic," indicative of cells requiring dynamic bandwidth.

In a frame relay setting, the present mechanism is used to monitor and limit both dynamic and allocated bandwidth. In a setting involving purely internet traffic, only the dynamic portions of the mechanism may be of significance. In a setting involving purely CBR flow, only the allocated portions of the mechanism would be employed. Thus, the presently disclosed method and apparatus enables the maximized use of mixed scheduling connections—those requiring all allocated bandwidth to those requiring all dynamic bandwidth, and connections therebetween.

Figure 13A:
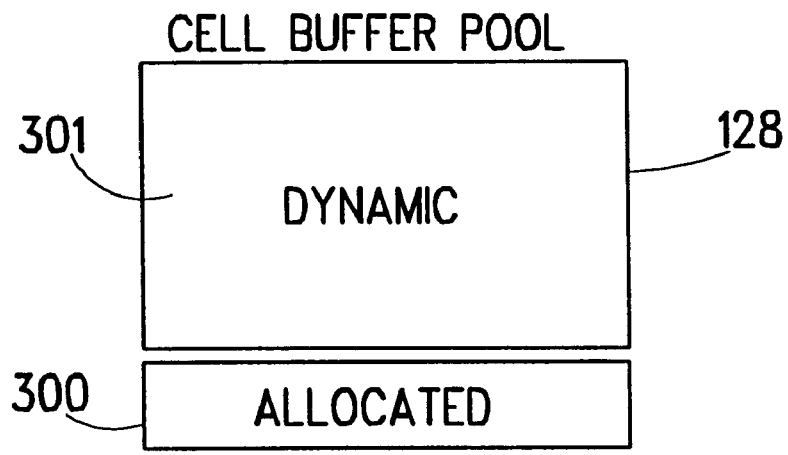
FIGS. 13A and 13B illustrate alternative embodiments of cell buffer pools according to the present invention as viewed from an upstream element.

In the present mechanism, a downstream cell buffer pool 128, akin to the pool 28' of FIG. 2, is logically divided between an allocated portion 300 and a dynamic portion 301, whereby cells identified as to receive allocated bandwidth are buffered within this allocated portion 300, and cells identified as to receive dynamic bandwidth are buffered in the dynamic portion 301. FIG. 13A shows the two portions 300, 301 as distinct entities; the allocated portion is not a physically distinct block of memory, but represents a number of individual cell buffers, located anywhere in the pool 128.

Figure 13B:
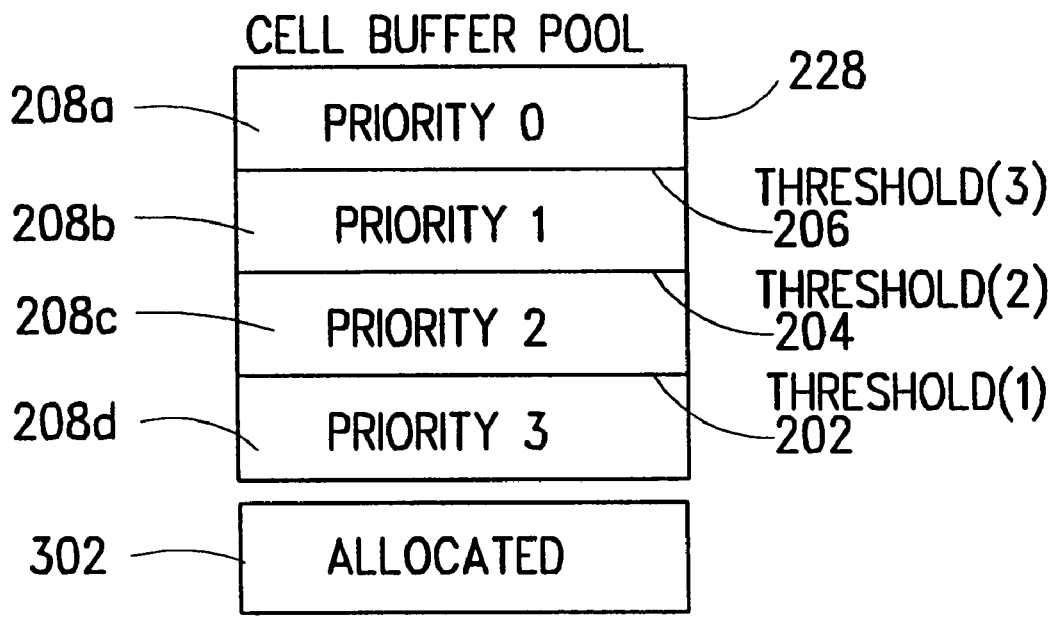

In a further embodiment, the presently disclosed mechanism for guaranteeing minimum bandwidth is applicable to a mechanism providing prioritized access to downstream buffers, as previously described in conjunction with FIGS. 10 and 11. With regard to FIG. 13B, a downstream buffer pool 228 is logically divided among an allocated portion 302 and a dynamic portion 208, the latter logically subdivided by threshold levels 202, 204, 206 into prioritized cell buffer subsets 208*a*–*d*. As with FIG. 13A, the division of the buffer pool 228 is a logical, not physical, division.

Figure 14:
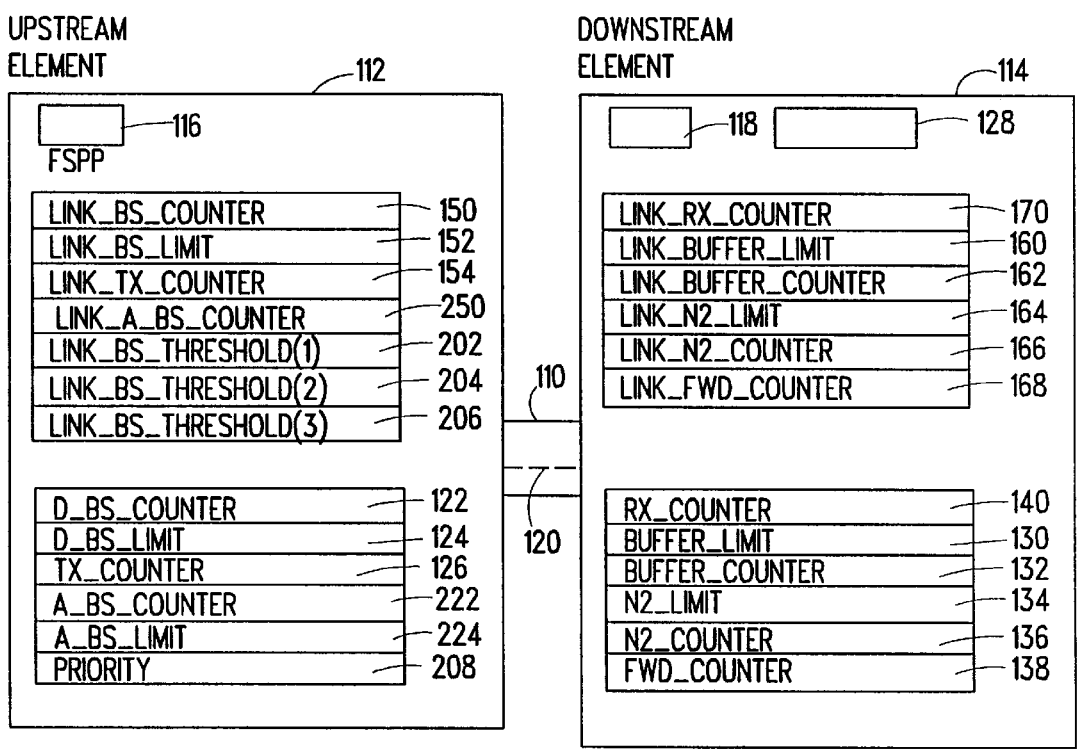
FIG. 14 is a block diagram of a flow control apparatus in an upstream element providing guaranteed minimum bandwidth and prioritized access to a shared buffer resource in a downstream element according to the present invention.

Elements required to implement this guaranteed minimum bandwidth mechanism are illustrated in FIG. 14, where like elements from FIGS. 2 and 11 are provided with like reference numbers, added to 100 or 200. Note that no new elements have been added to the downstream element; the presently described guaranteed minimum bandwidth mechanism is transparent to the downstream element.

New aspects of flow control are found at both the connection and link levels. With respect first to the connection level additions and modifications, D_BS_Counter 122 highlights resource consumption by tracking the number of cells scheduled using dynamic bandwidth transmitted downstream to the receiver 114. This counter has essentially the same function as BS_Counter 22' found in FIG. 2, where there was no differentiation between allocated and dynamically scheduled cell traffic. Similarly, D_BS_Limit 124, used to provide a ceiling on the number of downstream buffers available to store cells from the transmitter 112, finds a corresponding function in BS_Limit 24' of FIG. 2. As discussed previously with respect to link level flow control, the dynamic bandwidth can be statistically shared; the actual number of buffers available for dynamic cell traffic can be over-allocated. The amount of "D" buffers provided to a connection is equal to the RTT times the dynamic bandwidth plus N2. RTT includes delays incurred in processing the update cell.

A_BS_Counter 222 and A_BS_Limit 224 also track and limit, respectively, the number of cells a connection can transmit by comparing a transmitted number with a limit on buffers available. However, these values apply strictly to allocated cells; allocated cells are those identified as requiring allocated bandwidth (the guaranteed minimum bandwidth) for transmission. Limit information is set up at connection initialization time and can be raised and lowered as the guaranteed minimum bandwidth is changed. If a connection does not have an allocated component, the A_BS_Limit 224 will be zero. The A_BS_Counter 222 and A_BS_Limit 224 are in addition to the D_BS_Counter 122 and D_BS_Limit 124 described above. The amount of "A" buffers dedicated to a connection is equal to the RTT times the allocated bandwidth plus N2. The actual number of buffers dedicated to allocated traffic cannot be over-allocated. This ensures that congestion on other connections does not impact the guaranteed minimum bandwidth.

A connection loses, or runs out of, its allocated bandwidth through the associated upstream switch once it has enqueued a cell but has no more "A" buffers as reflected by A_BS_Counter 222 and A_BS_Limit 224. If a connection is flow controlled below its allocated rate, it loses a portion of its allocated bandwidth in the switch until the congestion condition is alleviated. Such may be the case in multipoint-to-point (M2P) switching, where plural sources on the same connection, all having a minimum guaranteed rate, converge on a single egress point which is less than the sum of the source rates. In an embodiment of the presently disclosed mechanism in which the transmitter element is a portion of a switch having complimentary switch flow control, the condition of not having further "A" buffer states inhibits the intra-switch transmission of further allocated cell traffic for that connection.

The per-connection buffer return policy is to return buffers to the allocated pool first, until the A_BS_Counter 222 equals zero. Then buffers are returned to the dynamic pool, decreasing D_BS_Counter 122.

Tx_Counter 126 and Priority 208 are provided as described above with respect to connection-level flow control and prioritized access.

On the link level, the following elements are added to enable guaranteed minimum cell rate on a per-connection basis. Link_A_BS_Counter 250 is added to the FSPP 116. It tracks all cells identified as requiring allocated bandwidth that are "in-flight" between the FSPP 116 and the downstream switch fabric, including cells in the TSPP 118 cell buffers 128, 228. The counter 250 is decreased by the same amount as the A_BS_Counter 222 for each connection when a connection level update function occurs (discussed subsequently).

Link_BS_Limit 152 reflects the total number of buffers available to dynamic cells only, and does not include allocated buffers. Link_BS_Counter 150, however, reflects a total number of allocated and dynamic cells transmitted. Thus, connections are not able to use their dynamic bandwidth when Link_BS_Counter 150 (all cells in-flight, buffered, or in downstream switch fabric) minus Link_A_BS_Counter 250 (all allocated cells transmitted) is greater than Link_BS_Limit 152 (the maximum number of dynamic buffers available). This is necessary to ensure that congestion does not impact the allocated bandwidth. The sum of all individual A_BS_Limit 224 values, or the total per-connection allocated cell buffer space 300, 302, is in one embodiment less than the actually dedicated allocated cell buffer space in order to account for the potential effect of stale (i.e., low frequency) connection-level updates.

Update and check events are also implemented in the presently disclosed allocated/dynamic flow control mechanism. The downstream element 114 transmits connection level update cells when either a preferred list and a VBR-priority 0 list are empty and an update queue is fully packed, or when a "max_update_interval" (not illustrated) has been reached.

At the upstream end 112, the update cell is analyzed to identify the appropriate queue, the FSPP 116 adjusts the A_BS_Counter 222 and D_BS_Counter 122 for that queue, returning cell buffers to "A" first then "D", as described above, since the FSPP 116 cannot distinguish between allocated and dynamic buffers. The number of "A" buffers returned to individual connections is subtracted from Link_A_BS_Counter 250.

Other link level elements used in association with the presently disclosed minimum guaranteed bandwidth mechanism, such as Link_Tx_Counter 154, function as described in the foregoing discussion of link level flow control. Also, as previously noted, a further embodiment of the presently described mechanism functions with a link level flow control scenario incorporating prioritized access to the downstream buffer resource 228 through the use of thresholds 202, 204, 206. The function of these elements are as described in the foregoing.

The following is an example of a typical initialization in a flow controlled link according to the present disclosure:

Downstream element has 3000 buffers;

Link is short haul, so RTT*bandwidth equals one cell;

100 allocated connections requiring 7 "A" buffers each, consuming 700 buffers total;

3000−700=2300 "D" buffers to be shared among 512 connections having zero allocated bandwidth;

Link_BS Limit=2300.

If D_BS_Counter >=D_BS_Limit, then the queue is prevented from indicating that it has a cell ready to transmit. In the embodiment referred to above in which the upstream element is a switch having composite bandwidth, this occurs by the queue being removed from the dynamic list, preventing the queue from being scheduled for transmit using dynamic bandwidth.

For allocated cells, a check is made when each cell is enqueued to determine whether the cell, plus other enqueued cells, plus A_BS_Counter, is a number greater than A_BS_Limit. If not, the cell is enqueued and the queue is placed on the preferred list. Else, the connection is prevented from transmitting further cells through the upstream element 112 switch fabric.

Figure 15A:
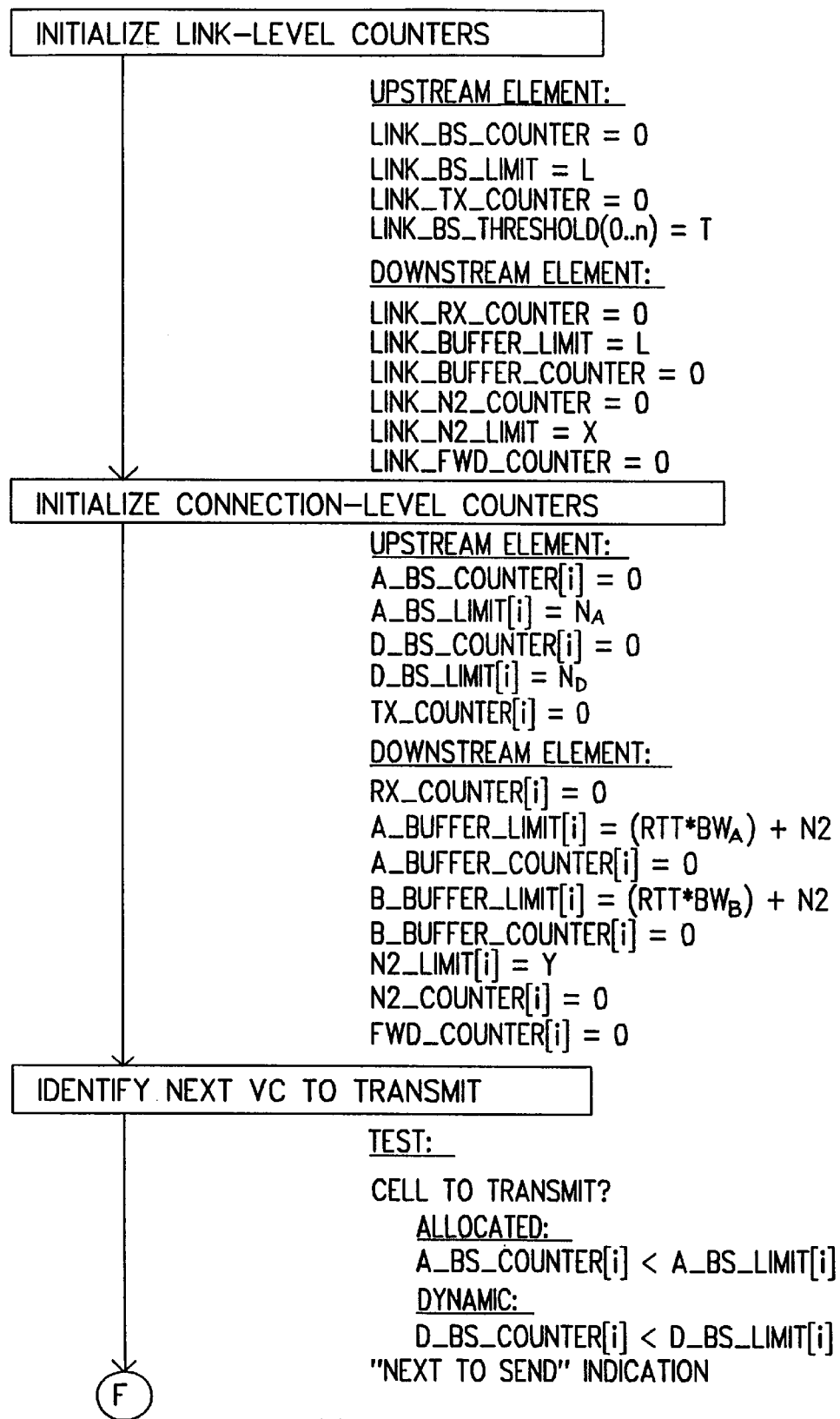
FIGS. 15A and 15B are flow diagram representations of counter initialization and preparation for cell transmission within a guaranteed minimum bandwidth mechanism employing prioritized access according to the present invention.

Initialization of the upstream element 112 as depicted in FIG. 14 is illustrated in FIG. 15A. Essentially, the same counters and registers set in FIG. 3A for an upstream element 12' (when prioritized access to a shared buffer resource is not enabled), and in FIG. 12A for an upstream element 12" (when prioritized access is enabled). Exceptions include: Link_A_BS_Counter 250 initialized to zero; connection-level allocated and dynamic BS_Counters 122, 222 set to zero; and connection-level allocated and dynamic BS_Limits 124, 224 set to respective values of $N_A$ and $N_B$. Similarly, on the downstream end at the connection level, the allocated and dynamic Buffer_Limits and Buffer_counters are set, with the Buffer_Limits employing a bandwidth value for the respective traffic type (i.e., $BW_A$=allocated cell bandwidth and $BW_D$=dynamic cell bandwidth). Further, each cell to be transmitted is identified as either requiring allocated or dynamic bandwidth as the cell is received from the switch fabric.

Figure 15B:
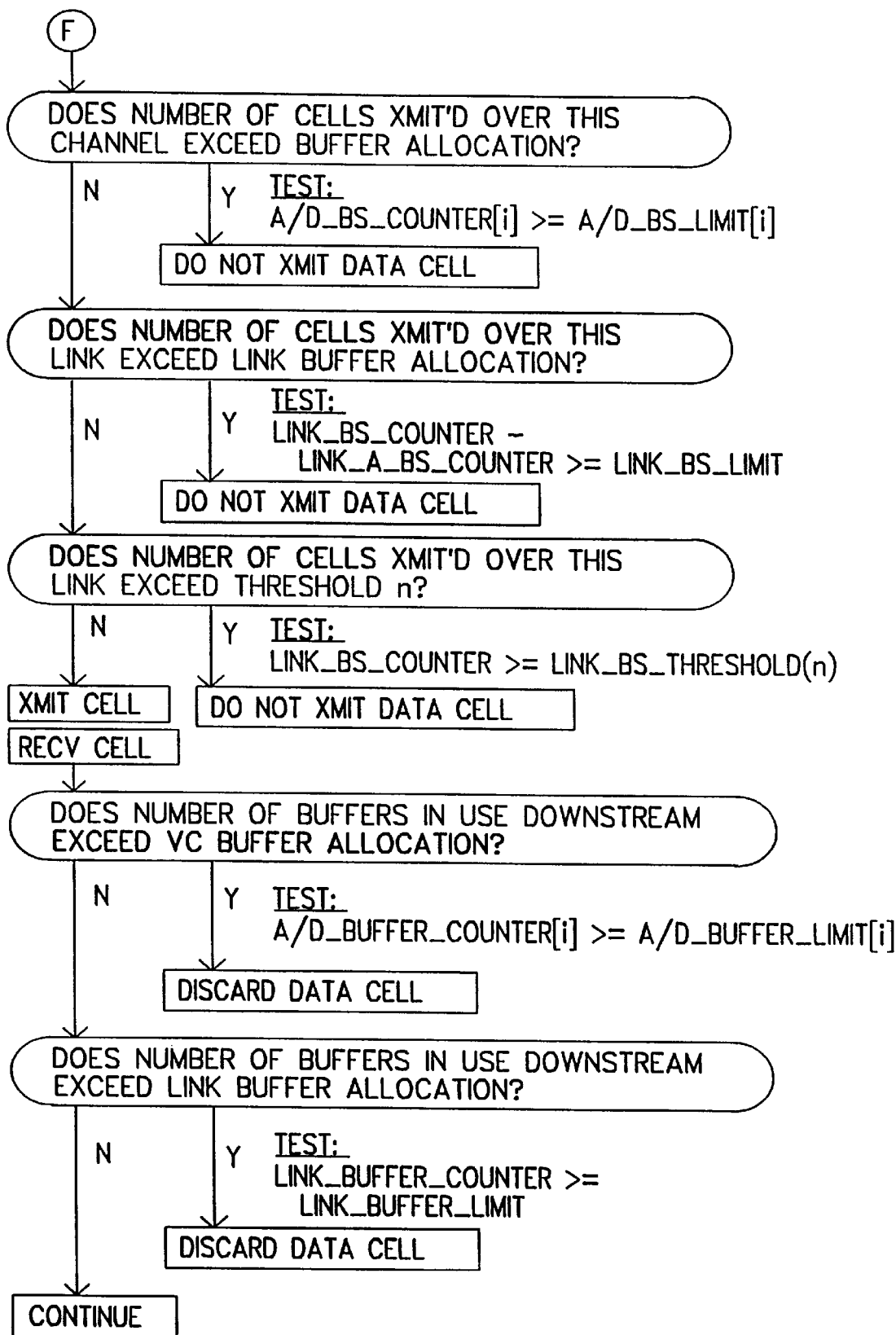

FIG. 15B represents many of the same tests employed prior to forwarding a cell from the upstream element 112 to the downstream element 114 as shown in FIGS. 3B and 12B, with the following exceptions. Over-allocation of buffer states on a link-wide basis is checked for dynamic traffic only and is calculated by subtracting Link_A_BS_Counter from Link_BS_Counter and comparing the result to Link_BS_Limit. Over-allocation on a per-connection basis is calculated by comparing D_BS_Counter with D_BS_Limit; programming or other failures are checked on a per-connection basis by comparing A_BS_Counter with A_BS_Limit. Similarly, over-allocation at the downstream element is tested for both allocated and dynamic traffic at the connection level. As previously indicated, the presently disclosed mechanism for providing guaranteed minimum bandwidth can be utilized with or without the prioritized access mechanism, though aspects of the latter are illustrated in FIG. 15A and 15B for completeness.

As discussed, connection-level flow control as known in the art relies upon discrete control of each individual connection. In particular, between network elements such as a transmitting element and a receiving element, the control is from transmitter queue to receiver queue. Thus, even in the situation illustrated in FIG. 16 in which a single queue $Q_A$ in a transmitter element is the source of data cells for four queues $Q_W$, $Q_X$, $Q_Y$, and $Q_Z$ associated with a single receiver processor, the prior art does not define any mechanism to handle this situation.

Figures 16, 17:
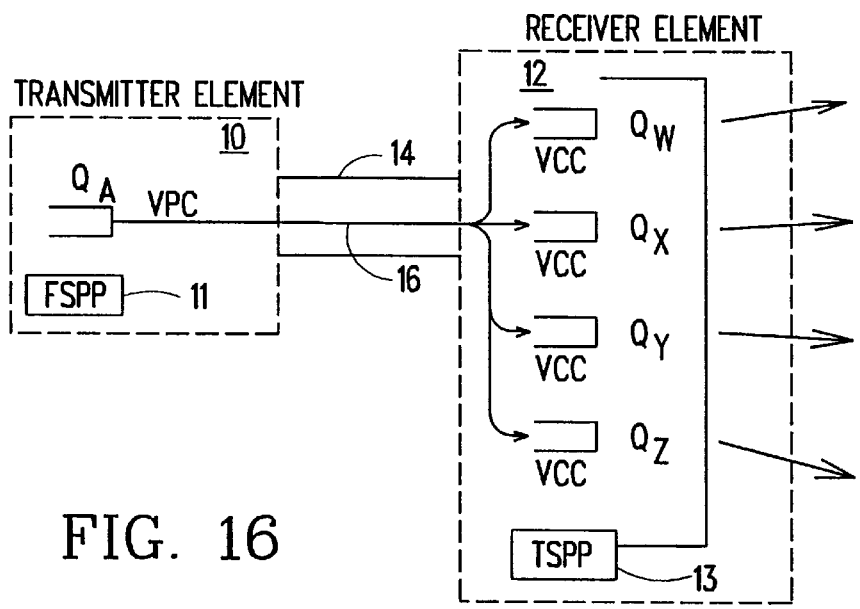
FIG. 16 is a block diagram representation of a transmitter, a data link, and a receiver in which the presently disclosed joint flow control mechanism is implemented.
FIG. 17 illustrates data structures associated with queues in the receiver of FIG. 16.

In FIG. 16, the transmitter element 10 is an FSPP element having a FSPP 11 associated therewith, and the receiver element 12 is a TSPP element having a TSPP 13 associated therewith. The FSPP 11 and TSPP 13 as employed in FIG. 16 selectively provide the same programmable capabilities as described above, such as link-level flow control, prioritized access to a shared, downstream buffer resource, and guaranteed minimum cell rate on a connection level, in addition to a connection-level flow control mechanism. Whether one or more of these enhanced capabilities are employed in conjunction with the connection-level flow control is at the option of the system configurator.

Yet another capability provided by the FSPP and TSPP according to the present disclosure is the ability to treat a group of receiver queues jointly for purposes of connection-level flow control. In FIG. 16, instead of utilizing four parallel connections, the presently disclosed mechanism utilizes one connection 16 in a link 14, terminating in four separate queues $Q_W$, $Q_X$, $Q_Y$, and $Q_Z$, though the four queues are treated essentially as a single, joint entity for purposes of connection-level flow control. This is needed because some network elements need to use a flow controlled service but cannot handle the bandwidth of processing update cells when N2 is set to a low value, 10 or less (see above for a discussion of the update event in connection-level flow control). Setting N2 to a large value, such as 30, for a large number of connections requires large amounts of downstream buffering because of buffer orphaning, where buffers are not in-use but are accounted for up-stream as in-use because of the lower frequency of update events. This mechanism is also useful to terminate Virtual Channel Connections (VCC) within a Virtual Path Connection (VPC), where flow control is applied to the VPC.

This ability to group receiver queues is a result of manipulations of the queue descriptor associated with each of the receiver queues $Q_W$, $Q_X$, $Q_Y$, and $Q_Z$. With reference to FIG. 17, queue descriptors for the queues in the receiver are illustrated. Specifically, the descriptors for queues $Q_W$, $Q_X$, and $Q_Y$ are provided on the left, and in general have the same characteristics. One of the first fields pertinent to the present disclosure is a bit labelled "J." When set, this bit indicates that the associated queue is being treated as part of a joint connection in a receiver. Instead of maintaining all connection-level flow control information in each queue descriptor for each queue in the group, certain flow control elements are maintained only in one of the queue descriptors for the group. In the illustrated case, that one queue is queue $Q_Z$.

In each of the descriptors for queues $Q_W$, $Q_X$, and $Q_Y$, a "Joint Number" field provides an offset or pointer to a set of flow control elements in the descriptor for queue $Q_Z$. This pointer field may provide another function when the "J" bit is not set. While Buffer_Limit (labelled "Buff_Limit" in FIG. 17) and N2_Limit are maintained locally within each respective descriptor, Joint_Buffer_Counter (labelled "Jt_Buff_Cntr"), Joint_N2_Counter (labelled "Jt_N2_Cntr"), and Joint_Forward_Counter (labelled "Jt_Fwd_Cntr") are maintained in the descriptor for queue $Q_Z$ for all of the queues in the group. The same counters in the descriptors for queues $Q_W$, $Q_X$, and $Q_Y$ go unused. The joint counters perform the same function as the individual counters, such as those illustrated in FIG. 2 at the connection level, but are advanced or decremented as appropriate by actions taken in association with the individual queues. Thus, for example, Joint_Buffer_Counter is updated whenever a buffer cell receives a data cell or releases a data cell in association with any of the group queues. The same applies to Joint_N2_Counter and Joint_Forward_Counter. In an alternate embodiment of the previously described flow control mechanism, each Forward_Counter is replaced with Receive_Counter. Similarly, in an alternative embodiment of the presently disclosed mechanism, Joint_Forward_Counter. is replaced with Joint_Receive_Counter, depending upon which is maintained in each of the group queues. Only the embodiment including Forward_Counter and Joint_Forward_Counter are illustrated.

Not all of the per-queue descriptor elements are superseded by functions in a common descriptor. Buffer-Limit (labelled "Buff_Limit" in FIG. 17) is set and referred to on a per-queue basis. Thus, Joint_Buffer_Counter is compared against the Buffer_Limit of a respective queue. Optionally, the Buffer_Limit could be Joint_Buffer_Limit, instead of maintaining individual, common limits. The policy is to set the same Buffer_Limit in all the TSPP queues associated with a single Joint_Buffer_Counter.

An update event is triggered, as previously described, when the Joint_N2_Counter reaches the queue-level N2_Limit. The policy is to set all of the N2_Limits equal to the same value for all the queues associated with a single joint flow control connection.

When a check cell is received for a connection, an effort to modify the Receive_Counter associated with the receiving queue results in a modification of the Joint_Receive_Counter. Thus, the level of indirection provided by the Joint_Number is applicable to both data cells and check cells.

At the transmitter element 10, only one set of upstream flow control elements are maintained. At connection set-up time, the joint connection is set-up as a single, point-to-point connection, as far as the upstream elements are concerned. Therefore, instead of maintaining four sets of upstream elements for the embodiment of FIG. 16, the presently disclosed mechanism only requires one set of elements (Tx_Counter, BS_Counter, BS_Limit, all having the functionality as previously described).

Once a joint flow control entity has been established, other TSPP queues for additional connections may be added. To do so, each new queue must have the same N2_Limit and Buffer_Limit values. The queues for the additional connections will reference the common Joint_N2_Counter and either Joint_Forward_Counter or Joint_Receive_Counter.

As previously noted, when J=1, the Joint_Number field is used as an offset to the group descriptor. The Joint_Number for the group descriptor is set to itself, as shown in FIG. 17 with regard to the descriptor for queue $Q_Z$. This is also the case in point-to-point connections (VCC to VCC rather than the VPC to VCC, as illustrated in FIG. 16), where each Joint_Number points to its own descriptor. Implementation for each of point-to-point and the presently described point-to-multipoint connections is thus simplified.

Having described preferred embodiments of the invention, it will be apparent to those skilled in the art that other embodiments incorporating the concepts may be used. These and other examples of the invention illustrated above are intended by way of example and the actual scope of the invention is to be determined from the following claims.

What is claimed is:

1. A method for providing a minimum guaranteed bandwidth to a connection transmitting a cell over a link from a transmitter to a receiver for storage of said cell in a shared buffer resource in said receiver, said method comprising the steps of:

determining whether said cell to be transmitted requires allocated bandwidth or dynamic bandwidth;

generating a first count indicative of a number of cells transmitted to said receiver over said connection for storage in said shared buffer resource using allocated bandwidth;

generating a second count indicative of a number of cells transmitted to said receiver over said connection for storage in said shared buffer resource using dynamic bandwidth;

generating a third count indicative of a number of cells transmitted to said receiver over said link for storage in said shared buffer resource using dynamic bandwidth;

storing a limit to the number of cells requiring allocated bandwidth which can be stored in said buffer resource for said connection;

storing limits to the number of cells requiring dynamic bandwidth which can be stored in said buffer resource for said connection and for said link;

identifying whether said limits are equaled or exceeded by a respective one of said first, second or third counts; and disabling transmission of said cell if one of said limits is equaled or exceeded by a respective one of said first, second or third counts.

2. A method for providing minimum guaranteed bandwidth to a connection of a link when transmitting, over a communications medium supporting said link, a data cell from a transmitter to a receiver via allocated or dynamic bandwidth for storage in a buffer resource associated with said receiver, said buffer resource having allocated and dynamic portions, said method comprising the steps of:

identifying a bandwidth type to utilize in transmitting said data cell over said connection from among allocated and dynamic bandwidth types;

determining, based upon said identified bandwidth type, whether bandwidth is available to said connection;

determining, based upon said identified bandwidth type, whether bandwidth is available to said link; and transmitting said data cell by said transmitter and receiving and buffering said data cell by said receiver only if bandwidth is determined to be available to both said connection and said link.

3. The method of claim 2 wherein said step of determining whether bandwidth is available to said connection comprises:

comparing
a first count, associated with said connection and for said identified bandwidth type, indicative of a number of data cells transmitted by said transmitter to said receiver through said connection using said identified bandwidth type, with
a transmitted-data cell limit for said identified bandwidth type of said connection; and
establishing connection bandwidth availability if said first count is less than said transmitted-data cell limit of said connection.

4. The method of claim 3 wherein said step of determining whether bandwidth is available to said connection further comprises:

correcting said first count in response to receipt, by said transmitter from said receiver, of an update cell indicating utilization by said connection of said buffer resource in said receiver if said first count for said allocated bandwidth type does not equal zero.

5. The method of claim 3, wherein said step of determining whether bandwidth is available to said connection further comprises:

correcting said first count for said dynamic bandwidth type in response to receipt, by said transmitter from said receiver, of an update cell indicating utilization by said connection of said buffer resource associated with said receiver if said first count for said allocated bandwidth type does equal zero.

6. The method of claim 2 wherein said step of determining whether bandwidth is available to said link further comprises:

comparing
a second count indicative of a number of data cells, transmitted by said transmitter to said receiver, through said link using said dynamic bandwidth type, with
a transmitted-data cell limit for said dynamic bandwidth type of said link; and
establishing link bandwidth availability if said identified bandwidth type is said allocated bandwidth type or if said second count is less than said transmitted-data cell limit of said link.

7. The method of claim 6 wherein said step of determining link bandwidth availability further comprises:

correcting said second count in response to receipt, by said transmitter from said receiver, of an update cell indicating utilization by said link of said buffer resource associated with said receiver.

8. The method of claim 2 further comprising, if said identified bandwidth type is said dynamic bandwidth type, the steps of:

identifying a priority associated with said connection; and transmitting said data cell by said transmitter and receiving and buffering said data cell by said receiver only if transmission of a data cell of said identified priority is enabled.

9. The method of claim 8, wherein said step of transmitting conditioned upon enablement of said identified priority further comprises:

comparing a number of transmitted data cells to be buffered in said buffer resource with a threshold value corresponding to said identified priority; and enabling transmission of said data cell if said number of transmitted data cells to be buffered is less than said corresponding threshold value.

10. An apparatus providing guaranteed minimum per-connection bandwidth in a telecommunications network, comprising:

a communications medium having transmitter and receiver ends, said medium supporting a link having at least one connection for the transmission of data cells to be transmitted over said medium via allocated or dynamic bandwidth;

a transmitter at said transmitter end of said medium for transmitting a data cell over said medium;

a receiver at said receiver end of said medium for receiving said data cell from said transmitter;

a shared buffer resource associated with said receiver for buffering said data cell, said shared buffer resource including an allocated portion for buffering data cells to be transmitted over said medium via allocated bandwidth and a dynamic portion for buffering data cells to be transmitted over said medium via dynamic bandwidth;

a first count, maintained by said transmitter, of a number of data cells transmitted to said receiver through said connection using said allocated bandwidth for buffering in said resource;

a second count, maintained by said transmitter, of a number of data cells transmitted to said receiver through said connection using said dynamic bandwidth for buffering in said resource;

a first limit, maintained by said transmitter, representing a maximum number of data cells which can be transmitted to said receiver through said connection using said allocated bandwidth for buffering in said resource;

a second limit, maintained by said transmitter, representing a maximum number of data cells which can be transmitted to said receiver through said connection using said dynamic bandwidth for buffering in said resource; and a logic unit, associated with said transmitter, for comparing said first and second counts with a respective one of said first and second limits prior to transmitting said data cell through said connection.

11. The apparatus of claim 10 wherein said transmitter further comprises a transmission disabling element responsive to said logic unit for disabling transmission of said data cell when:

said first count equals or exceeds said first limit when said data cell is to be transmitted through said connection via said allocated bandwidth, or said second count equals or exceeds said second limit when said data cell is to be transmitted through said connection via said dynamic bandwidth.

12. The apparatus of claim 10 wherein said transmitter further comprises:

a third count, maintained by said transmitter, of a number of data cells transmitted to said receiver through said link using said dynamic bandwidth for buffering in said resource;

a third limit, maintained by said transmitter, representing a maximum number of data cells which can be transmitted to said receiver through said link using said dynamic bandwidth for buffering in said resource; and a logic unit, associated with said transmitter, for comparing said third count with said third limit prior to transmitting said data cell through said link.

13. The apparatus of claim 12 wherein said transmitter further comprises a transmission disabling element responsive to said logic unit for disabling transmission of said data cell when said third count equals or exceeds said third limit.

14. The apparatus of claim 10 wherein said transmitter further comprises:

an identifier, for each of said connections, of one of a plurality of priorities;

a register for maintaining a threshold number of data cells which can be transmitted through said link, for receipt by said receiver and for buffering by said shared buffer resource, for each of said plurality of priorities; and a third count, maintained by said transmitter, of a number of data cells transmitted to said receiver through said link using said dynamic bandwidth for buffering in said shared buffer resource.

15. The apparatus of claim 14 wherein said transmitter further comprises a logic unit for comparing said third count with said threshold number for said data cell connection priority and for enabling said data cell transmission through said link if said third count is less than said data cell connection priority threshold number.

16. The apparatus of claim 15 wherein:

said receiver further comprises link-level update cell constructing logic for providing buffer resource utilization information to said transmitter in update cells; and said transmitter further comprises link-level update cell processing logic for updating said third count.

17. The apparatus of claim 15 wherein said third count is derived in said transmitter from a fourth count, maintained by said transmitter and representing a number of data cells transmitted to said receiver through said link using said allocated bandwidth for buffering in said resource, subtracted from a fifth count, maintained by said transmitter and representing a number of data cells transmitted to said receiver through said link using both said allocated and dynamic bandwidths.

18. The apparatus of claim 10 wherein:

said receiver further comprises connection-level update cell constructing logic for providing buffer resource utilization information to said transmitter in update cells; and said transmitter further comprises connection-level update cell processing logic for updating said first count if said first count does not equal zero, and for updating said second count if said first count equals zero.

* * * * *